United States Patent [19]

Calundann et al.

[11] Patent Number: 5,250,633
[45] Date of Patent: Oct. 5, 1993

[54] FIBERS AND FIBRETS FROM BLENDS OF POLYBEZIMIDAZOLES AND AROMATIC POLYAMIDES, AROMATIC POLYAMIDE-HYDRAZIDES OR AROMATIC POLYAMIDES CONTAINING HETEROCYCLIC LINKAGES

[75] Inventors: Gordon W. Calundann; Edward C. Chenevey, both of N. Plainfield; Tai-Shung Chung, Randolph, all of N.J.

[73] Assignee: Hoechst Celanese Corp., Somerville, Del.

[21] Appl. No.: 647,392

[22] Filed: Jan. 29, 1991

[51] Int. Cl.$^5$ .................. C08L 79/06; C08L 79/08
[52] U.S. Cl. .................. 525/420; 525/432; 525/435
[58] Field of Search .................. 525/420, 432, 435

[56] References Cited

U.S. PATENT DOCUMENTS

| | | | |
|---|---|---|---|
| 4,973,629 | 11/1990 | Williams et al. | 525/432 |
| 5,066,541 | 11/1991 | Lubowitz et al. | 428/378 |
| 5,070,153 | 12/1991 | Alvarez et al. | 525/420 |
| 5,075,392 | 12/1991 | Harris et al. | 525/420 |
| 5,082,905 | 1/1992 | Lubowitz et al. | 525/420 |
| 5,095,075 | 3/1992 | Arnold et al. | 525/432 |
| 5,137,985 | 8/1992 | Chen, Sr. et al. | 525/431 |

*Primary Examiner*—Ana L. Carrillo
*Attorney, Agent, or Firm*—Joseph M. Mazzarese

[57] ABSTRACT

Fibers and fibrets of a novel miscible blend of component polymers comprising from about 5 weight percent to about 95 weight percent of a polybenzimidazole and from about 95 weight percent to about 5 weight percent of an aromatic polyamide, aromatic polyamide-hydrazide or aromatic polyamide containing heterocyclic linkages. Miscibility of the component polymers of the blend is indicated by infrared, X-Ray and Differential Scanning Calorimetry analyses and electron photomicrographs. In fibers or fibrets of a blend mostly comprised of a polybenzimidazole, it is preferred that the aromatic polyamide, aromatic polyamide-hydrazide or aromatic polyamide containing heterocyclic linkages be present in the blend in an amount sufficient to yield a blend with improved tensile properties compared to the polybenzimidazole and more thermally processable than the polybenzimidazole. The fibers or fibrets of the blend have a lower moisture regain than polybenzimidazole fibers or fibrets. In fibers or fibrets of a blend mostly comprised of an aromatic polyamide, aromatic polyamide-hydrazide or aromatic polyamide containing heterocyclic linkages, it is preferred that the polybenzimidazole be present in the blend in an amount sufficient to yield a blend with increased thermal stability and nonflammability compared to the aromatic polyamide, aromatic polyamide-hydrazide or aromatic polyamide containing heterocyclic linkages. The fibers or fibrets may be post-treated with heat or sulfuric acid in order to minimize their shrinkage when they are subsequently subjected to heat and in order to increase their resistance to solvents and acid.

29 Claims, 11 Drawing Sheets

FIBERS AND FIBRETS FROM BLENDS OF POLYBEZIMIDAZOLES AND AROMATIC POLYAMIDES, AROMATIC POLYAMIDE-HYDRAZIDES OR AROMATIC POLYAMIDES CONTAINING HETEROCYCLIC LINKAGES

This invention is concerned with novel fibers and fibrets comprised of a blend of a polybenzimidazole and an aromatic polyamide, aromatic polyamide-hydrazide or aromatic polyamide containing heterocyclic linkages. The novel fibers and fibrets are suitable for reinforcements in molding compositions, textile uses and the like.

The polymer blends used to prepare the fibers or fibrets of this invention are the subject of a concurrently filed application.

BACKGROUND OF THE INVENTION

The number of fibers from known classes of high performance polymers which are useful under severe environmental conditions is limited. In addition, some of the known classes of polymers are deficient in some properties, e.g., physical properties, solvent and thermal resistance, and processability. Some are also quite expensive.

Developments in the synthesis of rigid rod-like polymers have generated interest in forming composites by blending those polymers with conventional flexible coil polymers. This interest is based on potential improvements in fracture and impact toughness as well as other properties. In other words, the rigid rod-like polymer might behave as a strength member in a ductile matrix while the flexible matrix might provide toughness. However, achieving the potential benefits has been elusive in practice.

PRIOR ART

Polybenzimidazoles are generally characterized by a high degree of thermal and chemical resistance. They may be shaped to form fibers, films, and other articles of wide utility which show resistance to degradation by heat, hydrolytic media and oxidizing media. However, many of the polybenzimidazoles are not easily thermally processable at desirably low enough temperatures and pressures. In addition, the polybenzimidazoles have relatively high moisture regain, which, although desirable for some textile fibers, is undesirable for engineering plastics and composites. The polybenzimidazoles are also rather expensive polymers.

Commonly assigned U.S. Pat. No. 3,441,640 broadly discloses a wet spinning method for the production of polybenzimidazole filaments having a denier per filament of 0.1 to 50.

Dry spinning processes, in which the polymer solution is extruded vertically downward into a hot stream of dry gas, have also been disclosed for the production of polybenzimidazole filaments. However, with superfine filaments, the vertical distances commonly employed in such processes (e.g., 5 to 8 meters) may be a controlling factor since the filaments may not have sufficient strength to maintain integrity all the way to the bottom.

A dry jet/wet spinning process was disclosed in commonly assigned U.S. Pat. No. 3,851,025. That patent relates to the production of hollow polybenzimidazole filaments which are useful for specialized reverse osmosis applications.

Aromatic polyamides are the condensation products of aromatic dicarboxylic acids and aromatic diamines. Aromatic polyamide-hydrazides are the condensation products of aromatic dicarboxylic acids, hydrazine, aromatic aminocarboxylic acids and aromatic diamines. Aromatic polyamides containing heterocyclic linkages are the condensation products of aromatic dicarboxylic acid chlorides and aromatic diamines, one of which contains heterocyclic linkages. The three kinds of polyamides are characterized as generally having high glass transition temperatures and high heat distortion temperatures. Certain structures of the polyamides are capable of developing high tensile properties in the drawn state, but they do not have good nonflammability characteristics.

Takayanagi et al. (M. Takayanagi et al., J. Macromol. Sci. Phys., B17, 591(1980)) apparently conducted the first reported experiment on blending rigid microfibrils of wholly aromatic polyamides such as poly(1,4-benzamide) (PBA), poly(1,4-phenylene terephthalamide) (PPTA), and their block copolymers with nylon 6 or nylon 66. When one of those composites was fractured, they found in the fractured surface that microfibrils of PPTA were dispersed in the polymer matrix. Addition of a small percentage of polyaramides resulted in a blend fiber with better modulus and thermal properties. The composite produced by Takayanagi is comprised of discrete fibrils of high modulus PPTA dispersed in a nylon matrix. The composite is not a miscible system.

Hwang and coworkers (W. F. Hwang et al., *Polym. Eng. Sci.*, 23, 784 (1983) and W. F. Hwang et al., *J. Macromol. Sci. Phys.*, B22, 231(1983)) studied the phase diagrams and blend fiber properties of poly(p-phenylenebenzobisthiazole) (PBZT) with either poly(2,5,(6')-benzimidazole) or poly(2,5,(6')-benzothiazole). PBZT is a rigid rod-like polymer, and the other two are flexible polymers. Results showed that a molecular level composite of highly dispersed, oriented PBZT molecules in these flexible matrices was achieved. Films and fibers prepared from solution processing were reported to have very high modulus and strength, which improved further upon heat treatment. The characteristics of this system are similar to those of Takayanagi et al. Hwang et al. also must use a mixture of two strong acids to dissolve the polymers. Their resulting blend of polymers is not nearly as miscible as the polymer blends used for the fibers of the invention. The polymer blends used for the fibers or fibrets of the invention are miscible as indicated by infrared, X-ray diffraction and Differential Scanning Calorimetry analyses, and electron photomicrographs.

SUMMARY OF THE INVENTION

Briefly, the invention comprises novel fibers and fibrets of a blend of component polymers comprising from 5 weight percent to about 95 weight percent of a polybenzimidazole and from about 95 weight percent to about 5 weight percent of an aromatic polyamide, aromatic polyamide-hydrazide or aromatic polyamide containing heterocyclic linkages. Preferably, the fiber is comprised of at least about 10 to 30 weight percent of a polybenzimidazole or an aromatic polyamide, an aromatic polyamide-hydrazide or an aromatic polyamide containing heterocyclic linkages.

Fibers are filaments spun by any applicable spinning processes, e.g., dry spinning, dry jet-wet spinning or wet spinning, and may be in any form, e.g., continuous mono- or multi-filaments, yarns, tows or staple, i.e., filaments cut in lengths of, e.g., 0.25 to 2 inches. In contrast, "fibrets" are generally much shorter than fibers, often have side branches, and are formed by coagulating the polymeric material in a non-solvent with strong agitation. Fibrets generally have more surface area per unit of weight than fibers.

The fibers and fibrets of the invention may be prepared by a process which comprises dissolving component polymers comprising a polybenzimidazole and an aromatic polyamide, aromatic polyamide-hydrazide or aromatic polyamide containing heterocyclic linkages in a mutual evaporative solvent in relative weight proportions of each polymer of from about 5 to about 95 weight percent of the polybenzimidazole to about 95 to about 5 weight percent of the aromatic polyamide, aromatic polyamide-hydrazide or aromatic polyamide containing heterocyclic linkages, and then using the solution to form fibers or fibrets by a spinning process, e.g., dry spinning, dry jet-wet spinning or wet spinning under appropriate evaporative or coagulative conditions. Solvent remaining in the fibrets may be removed by washing with a non-solvent. Subsequently, the fibers or fibrets may be dried at a temperature below their degradation temperature. Dry spinning and dry jet-wet spinning are preferred for the preparation of fibers. Fibrets are made by a wet spinning process.

The fibers and fibrets may be post-treated with heat and/or sulfuric acid in order to minimize their shrinkage when subsequently subjected to heat and to increase their resistance to solvents and acids.

The novel fibers and fibrets of this invention have unexpected properties and benefits. The fibers and fibrets are useful under severe environmental conditions. The fibers and fibrets have good thermal resistance, flame resistance, solvent resistance, improved physical properties and good price/performance characteristics.

Although polybenzimidazoles generally have high thermal stability and good solvent resistance, they are expensive polymers with high moisture regain. Certain aromatic polyamides, aromatic polyamide-hydrazides and aromatic polyamides containing heterocyclic linkages have good physical properties, solvent solubility, and are less expensive than polybenzimidazoles, but their nonflammability is deficient in some respects.

Therefore, it is an object of this invention to provide fibers or fibrets containing polybenzimidazoles which are useful in applications where the polybenzimidazoles themselves were either not useful or not as useful.

It is a further object of this invention to provide fibers or fibrets containing blends of polybenzimidazoles and aromatic polyamides, aromatic polyamide-hydrazides or aromatic polyamides containing heterocyclic linkages, which are less expensive than polybenzimidazole fibers, which have higher thermal stability and are less flammable than fibers of aromatic polyamides, aromatic polyamide-hydrazides or aromatic polyamides containing heterocyclic linkages, and which have better price/performance characteristics.

BRIEF DESCRIPTION OF THE FIGURES

FIG. 1c shows the Fourier Transform IR scan of FIG. 1b together with a scan of the heat-treated and drawn fibers of a 71.4/28.6 polybenzimidazole (PBI)-/aromatic copolyamide (HMA) blend, as shown in FIG. 1a.

DESCRIPTION OF THE PREFERRED EMBODIMENTS

Figure 1A:
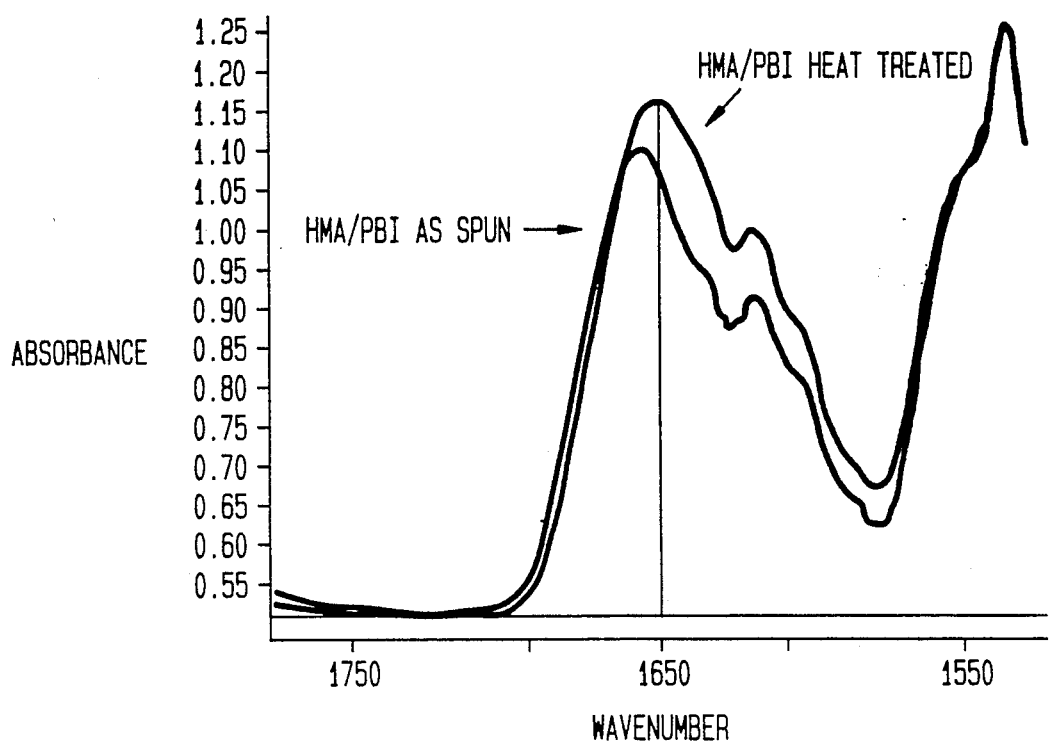
FIG. 1a shows the Fourier Transform IR scan of fibers of a 71.4/28.6 polybenzimidazole (PBI)/aromatic copolyamide (HMA) blend, indicating intermolecular hydrogen bonding. Because of the hydrogen bonding, the absorbance peak of the carbonyl group of the aromatic copolyamide shifted from 1657 to 1655 $cm^{-1}$ in the spun fiber and then to 1647 $cm^{-1}$ in the heat-treated and drawn fiber.

Aromatic polybenzimidazoles that may be used in the polymer blends for the fibers and fibrets of the invention and processes for the preparation of the polybenzimidazoles are described In a number of U.S. Pat. Nos., e.g., 2,895,948; Re. 26,065; 3,901.855; 4,002, 79; 3,433,772; 3,441,640; 3,509,108; 3,526,693; 3,549,603;

3,552,389; 3,610,453; 3,671,491; 3,969,430; and 4,020,142. In addition, a review of the processes for the preparation of polybenzimidazoles is contained in J. P. Critchley, G. J. Knight and W. W. Wright, *Heat-Resistant Polymers—Technologically Useful Materials,* Plenum Press, New York (1083), 259-322 and in the *Journal of Polymer Science,* Vol. 50, pages 511-509 (1961).

Although any polybenzimidazole described in the prior cart may be used, the preferred polybenzimidazoles employed as starting materials to prepare the novel fibers and fibrets of the present invention are those having the repeating unit formula:

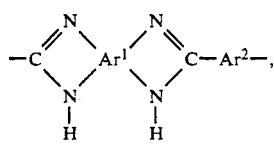

wherein $>Ar^1<$ represents a tetravalent aromatic moiety having the formula:

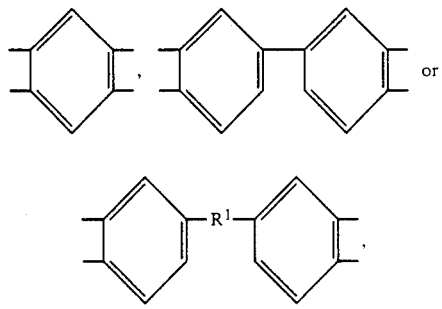

wherein $R^1$ is —O—, —SO$_2$—, —CH=CH—, or (—CH$_2$—)$_x$ and x is an integer of from 1 to 4; and —Ar$^2$— represents a divalent aromatic moiety having the formula:

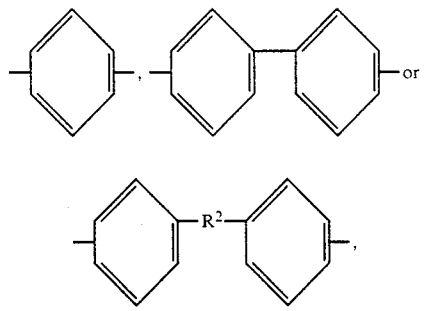

wherein $R^2$ is —O—, —SO$^2$—, —CH=CH—, or (—CH$_2$—) x and x is an integer of from 1 to 4.

Examples of the more preferred polybenzimidazoles which may be used to form the fibers or fibrets of the present invention include:
poly-2,2'-(m-phenylene)-5,5'-bibenzimidazole;
poly-2,2'-(pyridylene-3",5")-5,5'-bibenzimidazole;
poly-2,2'-(furylene-2",S")-5,5'-bibenzimidazole;
poly-2,2'-(naphthalene-1",6")-5,5'-bibenzimidazole;
poly-2,2'-(biphenylene 4",4"')-5,5'-bibenzimidazole;
poly-2,6'-(m-phenylene)-diimidazobenzene;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone,
poly-2,2'-(m-phenylene)-5,5'-di(benzimidazole)-methane;
poly-2,2'-(m-phenylene)-5,5" di(benzimidazole)-propane-2,2; and
poly-2,2'"-(m-phenylene)-5,5" di(benzimidazole)-ethylene-1,2 where the double bonds of the ethylene groups are intact in the final polymer.

Poly-2,2'-(m-phenylene)-5,5'-bibenzimidazole, which contains recurring units of the formula:

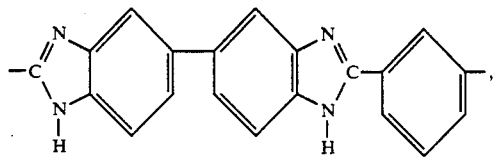

is most preferred. Aromatic polybenzimidazoles of this type are commercially available from HOECHST CELANESE Corporation. These polybenzimidazoles are preferred components of the fibers or fibrets because they are relatively more thermally stable and more soluble in N,N-dimethylacetamide than other polybenzimidazoles. This solubility makes them relatively processable.

A representative publication which discusses wholly aromatic polyamides is J. Preston, *Ultra-High Modulus Polymers,* A Cifieri and I. M. Ward, Eds., Applied Science Publishers, London, 1979.

Generally, the aromatic polyamides used in the fibers or fibrets of the invention have the following unit formula:

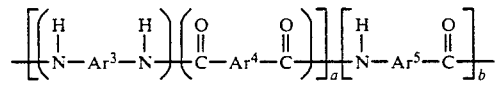

wherein Ar$^3$ and Ar$^4$ and Ar$^5$ represent divalent aromatic moieties having from 6 to about 18 carbon atoms, or mixtures thereof; and wherein a has a value of 0.5 to 1, b is 0 or a value less than 0.5, and the sum of a and b is equal to 1. Mixtures of different kinds of each unit may be present in the aromatic polyamides used in the invention. For example, mixtures of diamines may be used in preparing the aromatic polyamides so that Ar$^3$, and similarly Ar$^4$, and/or Ar$^5$, may represent different divalent aromatic moieties.

Although other classes of aromatic polyamides may be used in the fibers or fibrets of this invention, the preferred aromatic polyamides are those described in European Patent Application Serial No. 199,090 (corresponding U.S. patent application Ser. No. 841,842), which are incorporated herein by reference.

Therefore, if in the aromatic polyamides, the unit from the aromatic dicarboxylic acid

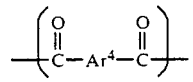

is denoted as an "A" unit, the unit

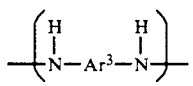

may be comprised of units

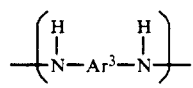

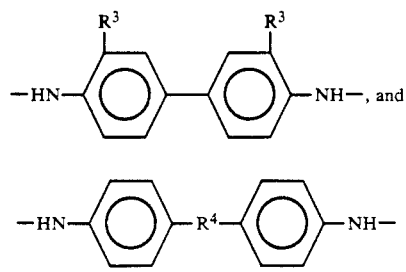

where in Ar 3 the valence bonds are in para- or comparable coaxial or parallel position; R 3 is a halogen radical, or an alkyl or alkoxy radical each having up to 4 carbon atoms; R$^4$ is a substituted or unsubstituted methylene radical or a grouping —O—Ar$^3$—O—, wherein —Ar$^3$— is as specified above.

The more preferred aromatic polyamides which may be used in the fibers or fibrets of the invention are those in which the mole % proportions of the diamine components B, C and D relative to the total amount of diamine components are within a domain which is defined by the following corner points:

point Q corresponds to 5 mole % of B, 45 mole % of C and 50 mole % of D;
point R corresponds to 45 mole % of B, 5 mole % of C and 50 mole % of D;
point S corresponds to 60 mole % of B, 35 mole % of C and 5 mole % of D;
point T corresponds to 20 mole % of B, 75 mole % of C and 5 mole % of D;
point U corresponds to 5 mole % of B, 80 mole % of C and 15 mole % of D;

and the aromatic polyamide has an inherent viscosity of about 2.4 to 6.5 dl/g (measured on solutions of 0.5 g of polyamide in 100 ml of 98% by weight concentrated H$_2$SO$_4$ at 25° C.).

A particular domain of interest within that domain is defined by the following corner points:

point Q' corresponds to 15 mole % of B, 45 mole % of C and 40 mole % of D;
point R' corresponds to 40 mole % of B, 20 mole % of C and 40 mole % of D;
point S' corresponds to 50 mole % of B, 40 mole % of C and 10 mole % of D;
point T' corresponds to 15 mole % of B, 75 mole % of C and 10 mole % of D.

Figure 7A:
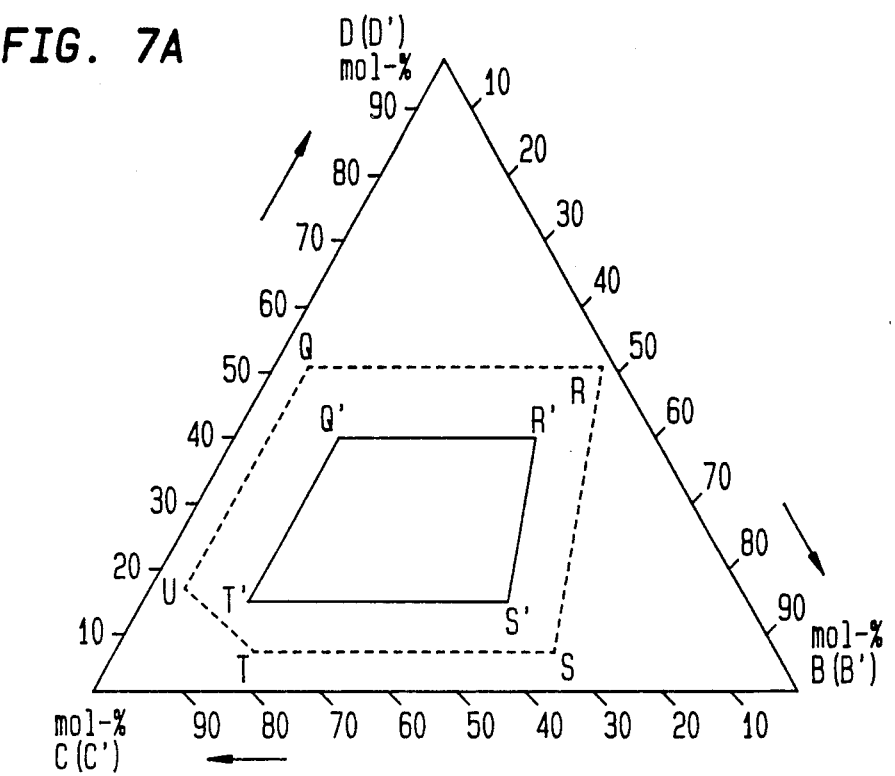
FIG. 7A illustrates mole percentages of three diamine components in aromatic polyamides which may be used in the present invention.
Figure 7B:
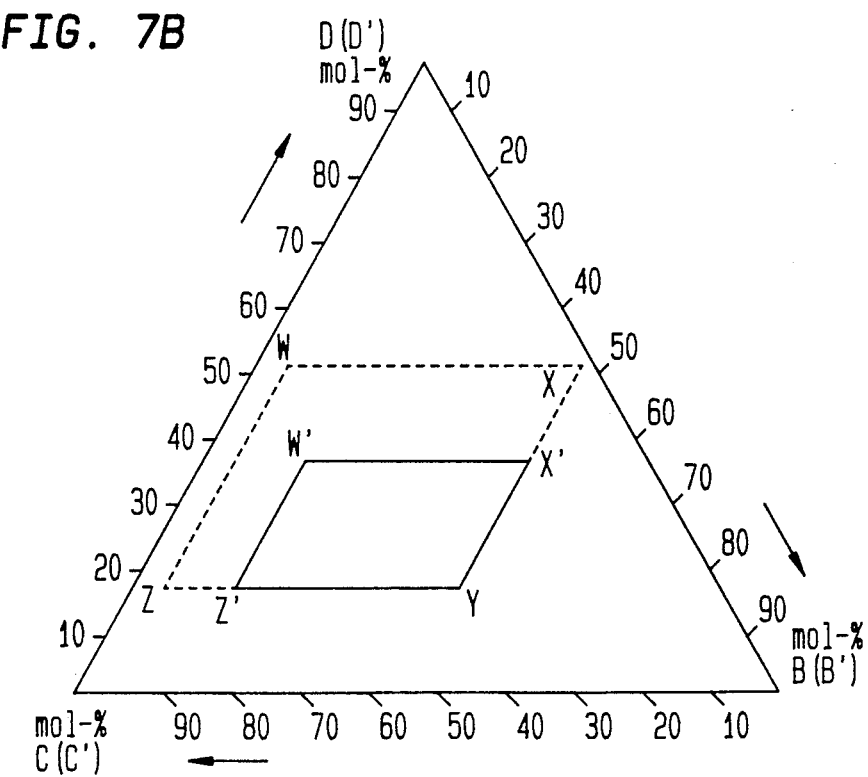
FIG. 7B illustrates preferred ranges for the mole percentage of the same three diamine components as in FIG. 7A.

The ranges of these domains are graphed in FIG. 7a. Preferred ranges follow and are graphed in FIG. 7b:
point W corresponds to 5 mole % of B, 45 mole % of C and 50 mole % of D;
point X corresponds to 45 mole % of B, 5 mole % of C and 50 mole % of D;
point Y corresponds to 45 mole % of B, 40 mole % of C and 15 mole % of D;
point Z corresponds to 5 mole % of B, 80 mole % of C and 15 mole % of D;

and the aromatic polyamide has an inherent viscosity of about 2.4 to 5.0 dl/g (measured on solutions of 0.5 g of polyamide in 100 ml of 98% by weight concentrated H$_2$SO$_4$ at 25° C.).

A particular domain of interest within that domain is defined by the following corner points:
point W' corresponds to 15 mole % of B, 50 mole % of C and 35 mole % of D;
point X' corresponds to 45 mole % of B, 20 mole % of C and 35 mole % of D;
point Y corresponds to 45 mole % of B, 40 mole % of C and 15 mole % of D;
point Z' corresponds to 15 mole X of B, 70 mole % of C and 15 mole % of D;

Preferably, Ar$^3$ and Ar$^4$ each denote a 1,4-phenylene radical; R$^3$ is —CH$_3$, —OCH$_3$ or —Cl; and R$^4$ is a

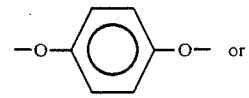

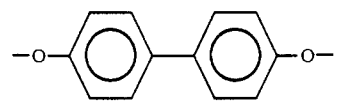

Most preferred aromatic polyamides which may be used in the fibers or fibrets and processes of this invention have repeating units derived from terephthalic acid and the following diamines:

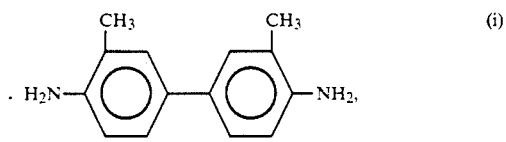

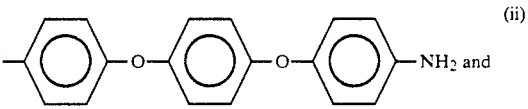

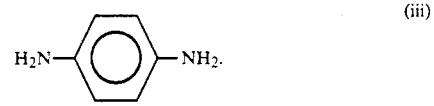

Preferred are mole ratios of (i):(ii):(iii) of 50:25:25 or 37.5:37.5:25.

Another class of aromatic polyamides is available commercially from Teijin Ltd. of Japan under the tradename Technola HM-50 in the form of a fiber. Information about the Technola HM-50 aromatic polyamides is contained in an article by J. Blackwell et al., Macromolecules, 20, 667–671 (1987). Technola HM-50 is an aromatic copolyamide of terephthaloyl chloride, p-phenylene diamine and 3,4'-diaminodiphenyl ether in a mole ratio of 50:25:25.

Aromatic polyamide-hydrazides may be incorporated in the fibers or fibrets of the invention. Those polymers and processes for their preparation are described in U.S. Pat. No. 3,632,548.

Generally, the aromatic polyamide-hydrazides used in the fibers or fibrets of the invention have the following unit formula:

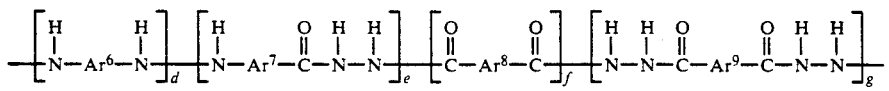

wherein $Ar^5$, $Ar^7$, $Ar^8$ and $Ar^9$ represent divalent aromatic moieties having from 6 to about 18 carbon atoms, or mixtures thereof; and wherein d has a value of 0.5 to 1, e is 0 or a value less than 0.5, and 9 is 0 or a value less than 0.5, and the sum of d, e and g is equal to r.

Although other classes of aromatic polyamide-hydrazides may be used in the fibers or fibrets of this invention, a preferred aromatic polyamide-hydrazide is the polyterephthalamide of p-aminobenzhydrazide, which may be prepared from terephthaloyl chloride and p-aminobenzhydrazide.

Aromatic polyamides containing heterocyclic linkages may also be used to produce the fibers or fibrets of the invention. Those polymers and processes for their preparation are described in U.S. Pat. No. 3,484,407.

Generally, the aromatic polyamide containing heterocyclic linkages used in the fibers or fibrets of the invention contains units of the following formula:

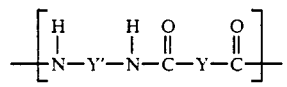

wherein Y' and y separately represent $Ar^{10}$ and $Ar^{1}$-$0$—X—$Ar^{11}$—X—$Ar^{10}$ wherein $Ar^{10}$ and $Ar^{11}$ are multivalent aromatic moieties having from 6 to about 18 carbon atoms, or mixtures thereof; and X is a 5 or 6 member ring heterocyclic radical containing 2 to 3 hetero ring elements selected from the group consisting of N, 0 and S, and wherein at least one $Ar^{10}$—X—$Ar^{1}$-$1$—X—$Ar^{10}$ radical must be present in the recurring structural unit. Preferably, all occurrences of X in the polymer are the same, and the polymer has at least one plane of symmetry in each recurring unit. The moiety —X—$Ar^{11}$—X— may represent a fused ring system.

A preferred aromatic polyamide containing heterocyclic linkages is prepared from

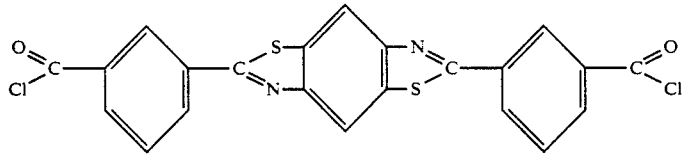

and 4,4'-diaminodiphenyl ether.

The aromatic acids which may be used to produce aromatic polyamides, aromatic polyamide-hydrazides or aromatic polyamides containing heterocyclic linkages typically are dicarboxylic acids in which each carboxyl group is attached to a carbon atom on the same ring or on an isolated or fused aromatic ring.

Representative examples of aromatic acids include terephthalic acid; isophthalic acid; diphenyl-4,4'-dicarboxylic acid; naphthalene-2,6-dicarboxylic acid; naphthalene-2,7-dicarboxylic acid; naphthalene-1,4-dicarboxylic acid; naphthalene-1,5-dicarboxylic acid; diphenylether,4,4'-dicarboxylic acid; diphenylsulfone-4,4'-dicarboxylic acid; diphenylmethane-4,4'-dicarboxylic acid and diphenoxyethane-4,4'-dicarboxylic acid; as well as the ester forming derivatives thereof.

Particularly desirable are those aromatic polyamides (and also aromatic polyamide-hydrazides and aromatic polyamides containing heterocyclic linkages) derived from aromatic diacids having the phthalate moiety,

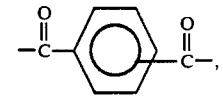

which may be from isophthalic acid, terephthalic acid or a mixture of the two at any ratios (e.g., ranging from 99% isophthalic acid and 1% terephthalic acid to 1% isophthalic acid and 99% terephthalic acid).

Representative aromatic diamines which may be used to produce the aromatic polyamides, aromatic polyamide-hydrazides or aromatic polyamides containing heterocyclic linkages typically are diamines in which the amino groups are attached to carbon atoms on the same ring or on isolated or fused aromatic rings. Examples of the aromatic diamines are 1,4-bis(p-aminophenoxy) benzene; 1,3-bis(p-aminophenoxy) benzene; 4,4'-diaminophenyl ether; 3,4'-diaminophenyl ether; 3,3'-diaminophenyl ether; 3,4'-diaminodiphenyl ether; 4,4'-diaminobiphenyl; 3,3'-diaminobiphenyl; 3,4'-diaminobiphenyl; and the like. The rings in the diamine compounds may have substituents such as aryl, alkyl, or alkoxy groups containing up to about 6 carbon atoms, or halogen radicals.

The aromatic aminoaroylhydrazide monomers which may be used to produce the aromatic polyamide-hydrazides typically have the amino and hydrazide groups attached to carbon atoms on the same ring or on isolated or fused benzene rings. Some examples are disclosed in U.S. Pat. No. 3,632,548.

Aromatic polyamides, aromatic polyamide-hydrazides and aromatic polyamides containing heterocyclic linkages may have incorporated therein units from aromatic amino acids such as p-aminobenzoic acid, m-aminobenzoic acid and the various aminonaphthalenecarboxylic acids.

One or more than one aromatic polyamide, aromatic polyamide-hydrazide and/or aromatic polyamide containing heterocyclic linkages may be blended with one or more polybenzimidazoles in the fibers or fibrets of the invention.

Blends of the component polymers for the fibers or fibrets of the invention are miscible, or compatible.

Several criteria indicate blend compatibility or miscability. They are:
a) Clearness of a film of the polymer blend (by visual analysis aided by microscopic examination, if necessary);
b) Differential Scanning Calorimetry showing a single Tg, which indicates that the blend follows the rule of mixtures;
c) Fourier Transform Infrared analysis indicating intermolecular hydrogen-bonding; and
d) X-ray diffraction analysis confirming that the component polymers interact and are compatible on a molecular scale.

Figure 3A:
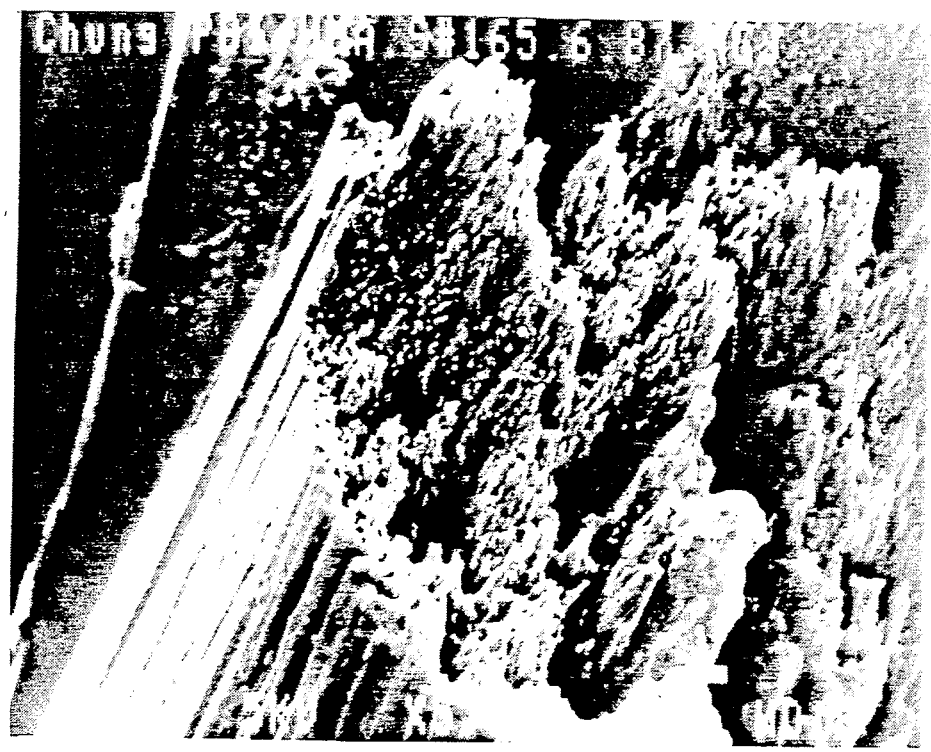
FIG. 3a is a 5,000 magnification scanning electron photomicrograph of a fracture surface of a fiber spun from a 50:50 blend of an aromatic copolyamide (HMA) and a polybenzimidazole (PBI).
Figure 3B:
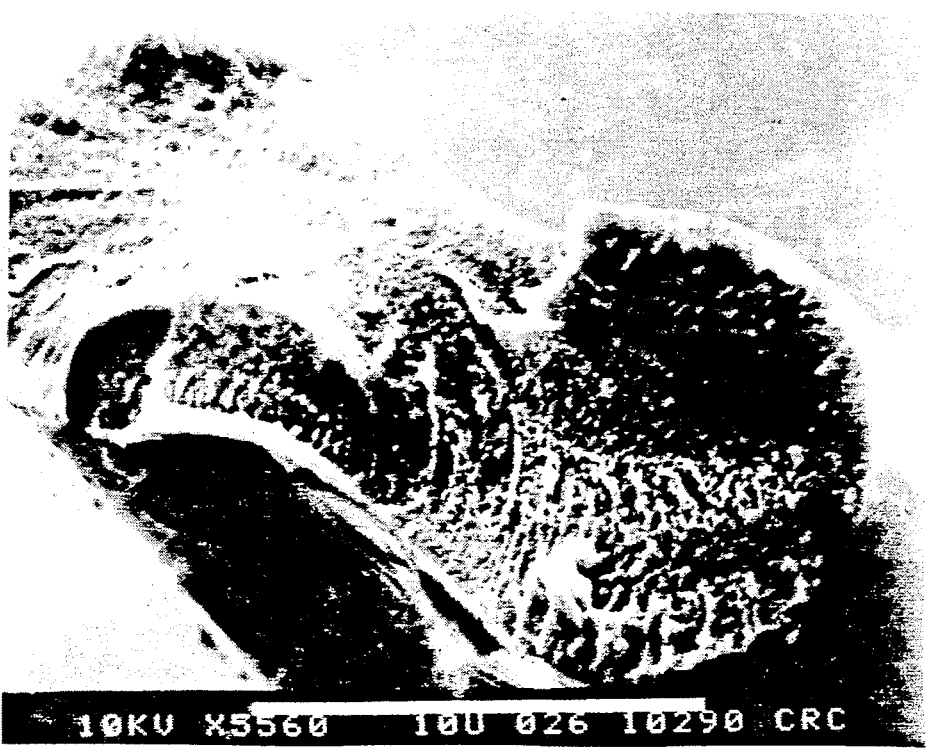
FIG. 3b is a 5,560 magnification scanning electron photomicrograph of a fracture surface of a fiber spun from a polybenzimidazole (PBI).
Figure 3C:
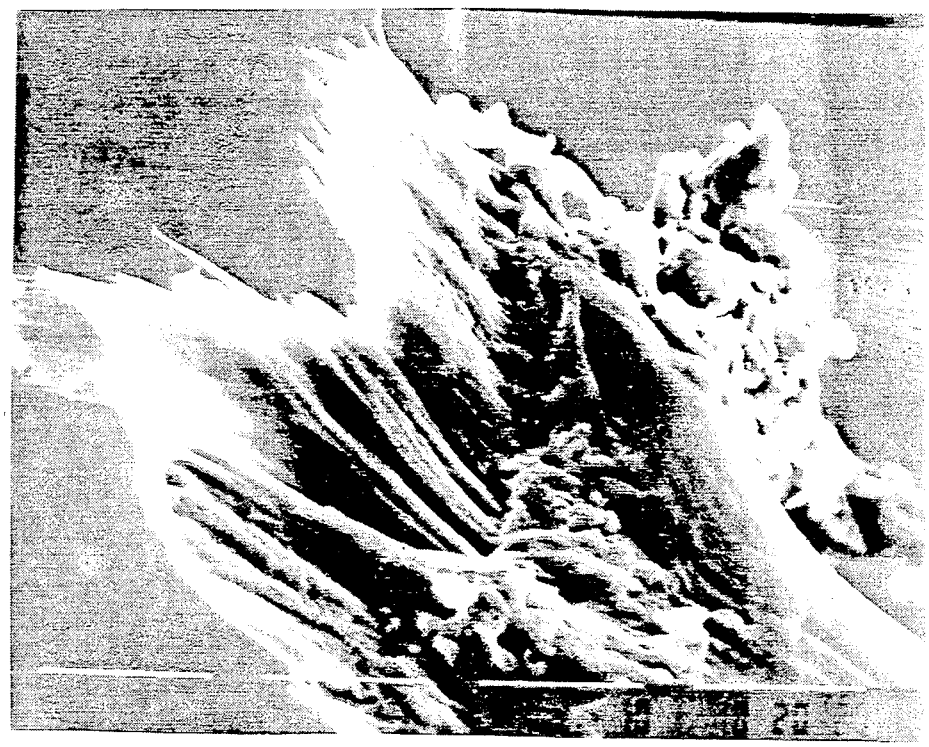
FIG. 3c is a 2,000 magnification scanning electron photomicrograph of a fracture surface of a fiber spun from an aromatic copolyamide (HMA).
Figure 3D:
FIG. 3d is a 5,000 magnification scanning electron photomicrograph of a fracture surface of a fiber spun from an aromatic copolyamide (HMA).

It is surprising that the polymer blends that are used to form the fibers or fibrets of the invention seem to be close to true solutions, but nevertheless are apparently true molecular composites with reinforcing elements on the order of molecular dimensions as evidenced by the physical properties of the fibers or fibrets and as evidenced by the scanning electron photomicrographs in FIGS. 3a, 3b, 3c and 3d. FIG. 3a is a 5,000 magnification scanning electron photomicrograph of a fracture surface of a fiber spun from a 50:50 blend of an aromatic copolyamide a-nd a polybenzimidazole. The photomicrograph shows that the degree of the blend is on the molecular level and that the fracture morphology is similar to that of a typical fracture of a rigid rod-like polymer. FIG. 3b is a 5,560 magnification scanning electron photomicrograph of a fracture surface of a fiber spun from a polybenzimidazole and shows no orientation phenomenon. The fracture surface is quite flat, which is typical for a flexible chain polymer. FIGS. 3c and 3d are respectively 2,000 and 5,000 magnification scanning electron photomicrographs of a fracture surface of a fiber spun from an aromatic copolyamide. FIGS. 3c and 3d show the highly oriented morphology of an aromatic copolyamide. Because aromatic polyamides have an LCP-like structure, it is very difficult to prepare good fracture surfaces for electron scanning photographs. However, FIGS. 3a to 3d clearly indicate the the polybenzimidazole-aromatic copolyamide blend fiber has highly oriented fracture surfaces, which are similar to those of aromatic copolyamide fibers.

If fibers or fibrets of the invention are comprised of a major amount of a polybenzimidazole, it is preferred that the minor amount of aromatic polyamide, aromatic polyamide-hydrazide or aromatic polyamide containing heterocyclic linkages in the fiber or fibret be sufficient to improve physical properties of the polybenzimidazole, e.g., tensile strength and modulus, and to make the polybenzimidazole more tractable and more processable and also less susceptible to moisture, while retaining the desirable properties of the polybenzimidazole. When a polybenzimidazole is blended with an aromatic polyamide, aromatic polyamide-hydrazide or aromatic polyamide containing heterocyclic linkages, the hydrophilicity of the blend is less than that of the polybenzimidazole. At the same time, the less expensive aromatic polyamide, aromatic polyamidehydrazide or aromatic polyamide containing heterocyclic linkages decreases the cost of the fiber below the cost of a polybenzimidazole fiber.

Generally, the preferred fibers or fibrets are comprised of from about 50 weight percent to about 95 weight percent of a polybenzimidazole and from about 50 weight percent to about 5 weight percent of an aromatic polyamide, aromatic polyamide-hydrazide or aromatic polyamide containing heterocyclic linkages.

Preferably, the fibers or fibrets comprise at least about 10 weight percent of an aromatic polyamide, aromatic polyamide-hydrazide or aromatic polyamide containing heterocyclic linkages.

If fibers or fibrets of the invention are comprised of a major amount of an aromatic polyamide, aromatic polyamide-hydrazide or aromatic polyamide containing heterocyclic linkages, it is preferred that the minor amount of polybenzimidazole in the fibers or fibrets be sufficient to improve the thermal stability and nonflammability of the aromatic polyamide, aromatic polyamide-hydrazide or aromatic polyamide containing heterocyclic linkages. Preferably, the polybenzimidazole is present in an amount sufficient to result in fibers or fibrets with greatly improved properties. More preferably, the fibers or fibrets are comprised of from about 60 weight percent to about 95 weight percent of an aromatic polyamide, aromatic polyamide-hydrazide or aromatic polyamide containing heterocyclic linkages and from about 40 weight percent to about 5 weight percent of a polybenzimidazole. Most preferably, based on preliminary tests, the fiber should contain at least about 20 to about 30 weight percent of a polybenzimidazole in order to impart greatly enhanced heat resistance to the aromatic polyamide, aromatic polyamide-hydrazide or aromatic polyamide containing heterocyclic linkages.

Aromatic polyamides, aromatic polyamide-hydrazides or aromatic polyamides containing heterocyclic linkages are useful because of their generally good combination of properties. The aromatic polyamides, aromatic polyamide-hydrazides or aromatic polyamides containing heterocyclic linkages have high heat resistance, high strength-to-weight ratios, high modulus, high dielectric constant and dissipation factor over a wide range of temperatures and frequencies. They have generally good resistance to solvents. Those properties can be substantially improved in accordance with this invention by incorporating a relatively more expensive polybenzimidazole in a miscible blend with the aromatic polyamide, aromatic polyamide-hydrazide or aromatic polyamide containing heterocyclic linkages. It appears that all the beneficial properties of the aromatic polyamides, aromatic polyamide-hydrazides or aromatic polyamide containing heterocyclic linkages may be retained and thermal properties and nonflammability may be improved at a moderate additional cost.

The more preferred fibers or fibrets are usually those which are comprised of about 20 to about 50% of either the polybenzimidazole or the aromatic polyamide, aromatic polyamide-hydrazide or aromatic polyamide containing heterocyclic linkages.

Generally, a solution spinning process for preparing fibers or fibrets from the miscible blends of component polymers comprises:
(a) forming a solution by dissolving a polybenzimidazole and an aromatic polyamide, aromatic polyamide-hydrazide or aromatic polyamide containing heterocyclic linkages in a mutual solvent in relative weight proportions of each polymer of from about 5 to about 95 weight percent of the polybenzimidazole to about 95 to about 5 weight percent of the aromatic polyamide, aromatic polyamide-hydrazide or aromatic polyamide containing heterocyclic linkages,
(b) then spinning fibers or fibrets from the solution under evaporative or coagulative conditions, (c) removing the remaining solvent by heating or washing the fibers or fibrets with a non-solvent, and (d) drying the resulting fibers or fibrets at a temperature below their degradation temperature.

Preferably, the starting polymers for the process of the invention are dried to a moisture level of about 0.1% to minimize problems. Drying may be accomplished in any convenient and effective manner, e.g., by drying the starting polymers overnight in vacuum at elevated temperature, e.g., from about 100° C. to about 160° C.

The polybenzimidazoles and the aromatic polyamides, aromatic polyamide-hydrazides or aromatic polyamides containing heterocyclic linkages are soluble in a few selected evaporative solvents. Those polymers may be dissolved in N-methylpyrrolidinone (NMP), N,N-dimethylformamide (DMF), N,N-dimethylacetamide (DMAc), or dimethylsulfoxide (DMSO). Heating may be required to dissolve certain polymers in order to obtain a clear viscous solution.

In order to prepare fibers or fibrets of the invention, the polybenzimidazoles and aromatic polyamides, aromatic polyamide-hydrazides or aromatic polyamides containing heterocyclic linkages may be first dissolved in a mutual evaporative solvent, e.g., N,N-dimethylformamide (DMF), N,N-dimethylacetamide (DMAc), dimethylsulfoxide (DMSO), or N-methylpyrrolidinone (NMP), so that each polymer is present in the resulting solution at the desired concentration up to a total polymer concentration of, e.g., from about 1% to about 30% preferably from about 8 to about 25%. The preferred solvents are DMAC and NMP. Acids ma be used instead of the evaporative organic solvent, but they are not preferred.

Preferably, the polybenzimidazole and the aromatic polyamide, aromatic polyamide-hydrazide or aromatic polyamide containing heterocyclic linkages are each present in the resulting solution in concentrations of from about 1% to about 30% on a weight/volume basis. More preferably, the polybenzimidazole and the aromatic polyamide, aromatic polyamide-hydrazide or aromatic polyamide containing heterocyclic linkages are each present in the resulting solution in concentrations of from about 1% to about 15% on a weight/volume basis.

It is preferred that the total concentration of the component polymers in the solution be such that the viscosity of the solution is acceptable for subsequent processing. The component polymers may be simultaneously dissolved in the solvent; or each polymer may be separately dissolved in separate volumes of solvent, and desired portions of the resulting solutions can be mixed together to form a solution of the two polymers. For example, a solution, or "dope," containing from about 20 to about 30 weight percent of polybenzimidazole may be prepared and mixed with a solution of from about 6 to about 10 weight percent of an aromatic polyamide, aromatic polyamide-hydrazide or aromatic polyamide containing heterocyclic linkages. The resulting solution may range from about 10 to about 20 weight percent of the blend.

It is generally desirable to add lithium chloride to the solution in order to aid the dissolving of the component polymers for the fiber. The range of effective amounts may be determined empirically. The lithium chloride concentration in the solution may range from about 0.5 to about 5 weight percent of the solution.

Preferably, the non-solvent is methanol, ethylene glycol, water, tetrahydrofuran or acetone.

Three types of solution spinning processes are commonly employed in the industry: dry spinning, wet spinning, and a hybrid process called dry jet-wet spinning, which has been shown to be advantageous in some systems and necessary in others.

A dry spinning process for the production of fibers of the polymer blend of the invention comprises:

(a) forming a spinning solution comprising approximately 10 to 35 percent by weight of the blend of the component polymers in a mutual solvent, (b) extruding the spinning solution through a plurality of extrusion orifices having a diameter of approximately 20 to 200 microns to form a plurality of filaments, and passing the filaments vertically downward into a column containing a gaseous atmosphere, with the concomitant initial drawing of the filaments and evaporation of solvent, (c) washing the filaments to substantially remove residual solvent, (d) drying the filaments, (e) hot drawing the filaments at a temperature of approximately 350° to 500° C. and at a draw ratio of approximately 1.5:1 to 20:1 to produce filaments of the blend having a denier per filament of approximately 0.5 to 10 and a tenacity of at least about 3 grams per denier, and (f) collecting the filaments.

In dry spinning, preferably:

(A) the spinning solution is extruded at a temperature of approximately 100° to 150° C.;

(B) the extrusion orifices have a diameter of approximately 30 to 100 microns;

(C) the gaseous atmosphere comprises an inert gas selected from the group consisting of nitrogen, the noble gases, and combustion gases;

(D) the initial drawing is at a draw ratio of approximately 2:1 to 10:1;

(E) the filaments are washed with water at a temperature of approximately 15° to 65° C.;

(F) the hot draw ratio is approximately 2:1 to 6:1.

Dry spinning, or evaporative spinning as it might be called, requires a viscous polymer solution in an evaporative solvent. This solution, or "dope," is extruded through the holes in a spinneret into a heated atmosphere which evaporates the bulk of the solvent from the fiber. Solvent is recovered from this atmosphere and after purification, is recycled back to dope preparation. This is a viable spinning method for the polymers of this invention, with DMAC being the preferred solvent—although other solvents, such as DMF, DMSO, NMP, etc., which are capable of dissolving the polymers, may be used instead. Because of the high boiling points of these solvents, rather long spinning columns are necessary to afford sufficient residence time to evaporate enough solvent to prevent individual fibers from sticking together when they are collected on a bobbin. Drawing in the column during fiber formation generally yields fibers of 10–20 microns in diameter with a characteristic shape determined by the polymer-solvent system.

The polybenzimidazole and the aromatic polyamide, aromatic polyamide-hydrazide or aromatic polyamide containing heterocyclic linkages are each provided in the spinning solution in a concentration of about 10 to 30 percent by weight based upon the weight of the total solution, and preferably in a concentration of 12 to 20 percent by weight based upon the weight of the total solution. The spinning solution preferably also contains lithium chloride in a concentration of about 0.1 to 5 percent by weight, and most preferably in a concentration of about 1 to 4 percent by weight. The lithium chloride serves the function of preventing the polybenzimidazole polymer from phasing out of the solution upon standing for extended periods of time, as well as aiding the dissolution of the polyamide. A preferred spinning solution comprises about 12 to 20 percent by weight of the component polymers, about 1 to 5 percent lithium chloride, and about 79 to 87 percent by weight N,N-dimethylacetamide. A particularly preferred spinning solution comprises approximately 14 to 17 percent by weight of the component polymers of the blend, approximately 2 percent by weight lithium chloride, and approximately 81 to 84 percent by weight N,N-dimethylacetamide. The spinning solution preferably exhibits a viscosity of about 40 to 4000 poise measured at 30° C., and most preferably a viscosity of about 1500 to 3500 poise measured at 30° C. One suitable means for dissolving the polymer in the solvent is mixing the materials at a temperature above the normal boiling point of the solvent, for example, about 25° to 70° C. above such boiling point, and at a pressure of 2 to 15 atmospheres for a period of about 1 to 5 hours. The resulting solutions are preferably filtered to remove any undissolved polymer.

The spinning solution is preferably provided at a temperature of approximately 100° to 150° C. at the time of extrusion. The solution is extruded through a plurality of extrusion orifices (e.g., anywhere from five or ten to several hundred). These extrusion orifices are usually in the form of a spinneret having 25 to 100 orifices. Generally, the orifices used in the present invention have a diameter of approximately 20 to 200 microns, preferably of approximately 30 to 100 microns, and most preferably of approximately 70 microns. The spinning solution is generally placed in a pressure vessel, or bomb, and heated to approximately 120° C. To spin, the solution may be fed under nitrogen pressure to a metering pump driven by a variable speed D.C. motor. The pump speed, and hence the solution flow rate, may be maintained constant by an electronic controller. In order to remove the last traces of particulate matter, the solution may be passed through a heated filter and finally, just before entering the spinneret, through a stainless steel sintered disc filter. The face of the spinneret is usually heated to approximately 100° to 150° C. during extrusion. In dry spinning and dry jet-wet spinning, the polymer solution is extruded vertically downward into a gaseous atmosphere. The gaseous atmosphere may be generally composed of any dry gas. Such gases include air and inert gases such as nitrogen, the noble gases and combustion gases.

Typically PBI fibers spun from DMAC as solvent are oval to FIG. 8 shaped in cross section. Dope temperatures are kept hot (~140° C.), and the column temperatures are well above the solvent boiling point of 165° C. Spinning speeds of several hundred meters per minute are normal. During the short residence time in the spinning column (~1 Second), sufficient solvent must be evaporated to prevent individual fibers from sticking together under the tension caused by passing over various rolls and being wound upon a bobbin. Typically for PBI, residual solvent levels of 20-35% remain at this step although with some PBI polymer blend systems, much lower levels can be obtained. The remainder of the solvent must be removed; this is usually done by washing with hot water. The as-spun fiber is usually wound on perforated bobbins, which are placed in a washer and hot water is pumped through them to remove the DMAC. Standing or oven drying will then remove the water. This "as-spun" fiber has a low strength and modulus but a high elongation.

Generally, more useful properties are obtained by further orientation or drawing of the fiber to increase strength and modulus and reduce elongation. For PBI, hot oven drawing is used. For other systems, drawing can be done In solvent or plasticizer baths as well. In any case, drawing is done at a temperature above the so-called "glass transition" or Tg of the system. Solvents or plasticizers lower the Tg of the system thus allowing drawing to be done at much lower temperatures than could be accomplished on a strictly thermal basis. On the other hand, it is necessary to get rid of the solvent or plasticizer subsequently, thus adding another step to the process. The Tg of PBI is 425° C.; blending with other polymers lowers that. PBI drawing may be done at about 440°-460° C. with about 3-10 second residence times and stretch ratios of about 1.5:1-5:1. Property profiles are developed depending upon conditions, and optimum conditions are chosen for the desired end use and process stability.

To minimize thermal shrinkage, and more particularly shrinkage in direct contact with a flame, which is an important PBI attribute, fibers and fibrets of blends containing PBI are optionally treated with dilute sulfuric acid, which is absorbed as an acid-base salt, and are then heated under conditions similar to those used for drawing but without stretching. This causes at least partial ring sulfonation; and although some sulfate can be subsequently washed out, about 5% bound S remains. Whereas drawn PBI is generally insoluble (swelling occurs), the acid treated-heat set material is even more insoluble. This step increases the density of the fibers and fibrets, and while the actual breaking load of fibers is not affected, the strength when expressed as normal fiber tenacity in g/denier or load/weight drops somewhat. If a continuous filament yarn is desired, the process is finished. For staple fiber, two more steps are necessary, crimping and cutting. Some cut fiber is not crimped, such as for a flock application. Crimping is necessary to put a wiggle in the smooth yarn so the yarn will stick together when twisted together with itself or with other fibers. Lengths produced in the cutting process vary from very short for a flocking to several inches depending on application. In all cases, yarn lubricants and plasticizers must be optimized and used to ensure runnability with the equipment.

A wet spinning process for the production of fibers Of a Polymer blend comprises:
(a) forming a spinning Solution comprising approximately 10 to 35 percent by weight of the component polymers of the blend in a mutual solvent,
(b) extruding the spinning solution through a plurality of extrusion orifices having a diameter of approximately 20 to 200 microns and into a coagulating bath comprised of a non-solvent for the component polymers in order to form a plurality of filaments,
(c) passing the filaments through the coagulating bath wherein (i) coagulation of the blend of the component polymers is accomplished, and (ii) the drawing of the filaments is initiated, with an initial draw ratio of approximately 0.5:1 to 20:1 being achieved,
(d) washing the resulting filaments to substantially remove residual solvent,
(e) drying the filaments, (f) hot drawing at a temperature of approximately 350° to 500° C. and at a hot draw ratio of approximately 1.5:1 to 20:1 to produce filaments of the blend having a denier per filament of approximately 0.5 to 10 and a tenacity of at least about 3 grams per denier, and (g) collecting the filaments.

In wet spinning, preferably:

(A) the spinning solution is extruded at a temperature of approximately 10° to 50° C.;

(B) the initial draw ratio is approximately 2:1 to 3.5:1;

(C) the filaments are washed with water at approximately 15° to 65° C.; and (D) the hot draw ratio is approximately 2:1 to 6:1.

Wet spinning or coagulation spinning uses a dope and spinneret like dry spinning, however extrusion is into a non-solvent bath where solvent from the fibers or fibrets diffuses into the bath and coagulant diffuses into the fiber. Both evaporative and non-evaporative solvents, such as mineral acids, can be used in this system. Because of hydrodynamic drag, spinning speeds are much lower than for dry spinning, but the loss of productivity can be compensated for when preparing staple by using very large spinnerets with many orifices, which are not practical in dry spun systems.

The non-solvent for the fiber, may be, e.g., methanol, ethylene glycol, tetrahydrofuran or acetone. A solution of ethylene glycol and N,N-dimethylacetamide (preferably, 70:30) is preferred in the coagulation bath. Subsequently, the precipitated fiber is washed with, e.g., methanol or water, to remove residual solvent if it is present and then, e.g., dried at moderate temperatures, and subsequently drawn.

If the transition from dope to fiber is too fast, porous fiber with poor properties is obtained. Consequently, the coagulant bath is typically a blend of solvent and nonsolvent, which is optimized along with the residence time to produce a good fiber. Since solvent will build up in the bath, non-solvent is continuously added to keep bath concentration constant. Stretching occurs in this bath just as it does in a dry spinning column. The remainder of the solvent and coagulant in the yarn are removed by subsequent washing steps.

These fibers are also generally drawn, either swollen with solvent or plasticizers and/or hot in exactly the same manner as for dry spun fiber. Optionally, crimping and cutting follow.

The filaments are drawn at an initial draw ratio of approximately 0.5:1 to 20:1 during their passage from the extrusion orifices to the exit from the coagulation bath. After being passed through the coagulation bath, the filaments are washed, dried, and hot drawn at a draw ratio of approximately 1.5:1 to 20:1. The resulting filaments have a denier per filament of approximately 0.5 to 25 and a tenacity of at least 3 grams per denier.

A dry jet-wet spinning process for the production of fibers of the polymer blend comprises:

(a) forming a spinning solution comprising approximately 10 to 35 percent by weight of the component polymers of the blend in a mutual solvent, (b) extruding the spinning solution through a plurality of extrusion orifices having a diameter of approximately 20 to 200 microns to form a plurality of filaments, and passing the filaments vertically downward into a gaseous atmosphere, with the concomitant drawing of the filaments.

(c) passing the resulting filaments from the gaseous atmosphere to a bath comprising a non-solvent for the component polymers, (d) Passing the filaments through the bath wherein (i) coagulation of the blend of the component polymers is accomplished, and (ii) the drawing of the filaments is continued, with an initial draw ratio of approximately 0.5:1 to 20:1 being achieved, (e) washing the resulting filaments to substantially remove residual solvent, (f) drying the filaments, (g) hot drawing at a temperature of approximately 350° to 500° C. and at a hot draw ratio of approximately 1.5:1 to 20:1 to produce filaments of the blend having a denier per filament of approximately 0.5 to 10 and a tenacity of at least about 3 grams per denier, and (h) collecting the filaments.

In dry jet-wet spinning, preferably:

(A) the extrusion orifices are situated approximately one-half inch to 10 inches above the coagulation bath;

(B) the spinning solution is extruded at a temperature of approximately 100° to 150° C.;

(C) the extrusion orifices have a diameter of approximately 30 to 100 microns;

(D) the gaseous atmosphere comprises air or an inert gas selected from the group consisting of nitrogen, the noble gases, and combustion gases;

(E) the liquid coagulation bath comprises water, ethylene glycol, or a mixture of a major amount of water or ethylene glycol and a minor amount of N,N-dimethylacetamide;

(F) the liquid coagulation bath is maintained at a temperature of approximately 15° to 25° C.;

(G) the initial draw ratio is approximately 2:1 to 10:1;

(H) the filaments are washed with water at a temperature of approximately 15° to 65° C.; and (I) the hot draw ratio is approximately 2:1 to 6:1.

The dry jet-wet spinning method draws on the strengths of both of the dry spinning and wet spinning methods. Dopes and spinnerets are the same, extrusion occurs into a short column or shroud with the fibers then entering a coagulant bath. By removing the spinneret from the coagulant bath where it is in wet spinning, it is possible to maintain separate temperatures for both dope (spinneret) and coagulant. Separation of the spinneret and coagulant bath allows fiber orientation or stretching as in dry spinning before coagulation, and non-volatile acid type solvents can be used as in wet spinning. Typically the gap between spinneret and bath is short (inches) so little solvent evaporation takes place; thus most solvent is removed by the bath as in wet spinning. Baths generally are short, however, and speeds generally faster than in wet spinning.

When fibers are dry spun or dry jet-wet spun from the solution of the component polymers, the solvent should be evaporated at low relative humidity, e.g., in a dry nitrogen atmosphere, and moderate temperatures, e.g., at about $\geq 100°$ C. After a substantial portion of the solvent is removed (e.g., about 85%), the remaining solvent may be removed by washing the fibers with hot water.

In dry jet-wet spinning, the extruded solution is permitted to drop freely for a short distance prior t& being passed through a liquid coagulation bath. In this way, a certain amount of drawing occurs and some coagulation is initiated before the polymer meets the coagulation bath. This initial coagulation of polymer in the gaseous atmosphere is ordinarily accomplished through evaporation of a portion of the solvent and/or reduced polymer solubility resulting from the reduction in temperature of the extruded solution. Approximately 5 to 10 percent of the solvent is usually lost in the gaseous atmosphere through evaporation. The distance between the face of the spinneret and the coagulation bath, known as the "air" gap, is known to influence the quality of filaments spun by the dry jet-wet spinning process. Air gaps suitable for use in the present invention range from approximately one-half inch to 10 inches, and preferably from approximately 5 to 7 inches. The most preferred air gap is approximately 7 inches. After dropping through the air gap, the filaments are passed through a liquid coagulation bath, comprising a non-solvent for the component polymers in the filaments. This bath preferably consists of water or ethylene glycol, but may also be a mixture of water or ethylene glycol and N,N-dimethylacetamide. Little or no obvious differences in yarn properties result from baths of water or a mixture of water and N,N-dimethylacetamide.

Other coagulants are also feasible. Generally, if a mixture of water and one of the above-mentioned liquids is employed as the coagulant, the liquid used corresponds to the solvent used in forming the spinning solution. As the spinning progresses, a slight flow of the coagulant is continuously fed into the coagulation bath to prevent a build-up of solvent which has been removed from the extruded filaments. The bath composition and bath temperature generally are related to the coagulation rate. It is preferred that the polymer composition coagulate at such a rate as to minimize inhomogeneities from the outer surface to the inner core. Although a wide range of bath temperatures may be employed, an examination of various bath temperatures indicated that cool temperatures are preferable. Therefore, the bath is preferably maintained at approximately normal room temperature for flowing liquid (i.e., approx. 15° to 25° C.). While being passed through the bath, the coagulated filaments continue to undergo the drawing which was begun in the air gap. The term "draw ratio", as is well known, is a measure of the degree of stretching during the orientation of the fibrous material. In the present invention, the initial draw ratio is a measure of the degree of stretching of the filaments which occurs between the extrusion orifices and the exit from the coagulation bath. *Initial draw ratio* is defined as exit velocity divided by jet speed.

The exit velocity is the speed at which the filaments leave the coagulation bath. Although any means of measurement may be used, the exit velocity is conveniently determined by the surface speed of the rolls which take up the filaments after their exit from the coagulation bath. Thus, the speed of the wash rolls is preferably measured for this purpose. The jet speed is the speed at which the extruded polymer exits an extrusion orifice. The jet speed is conveniently determined by dividing the total polymer extrusion volume per unit of time by the total surface area of the extrusion orifices. In the present invention, the initial draw ratio is approximately 0.5:1 to 20:1. Preferably, the initial draw ratio is approximately 2:1 to 10:1, and, most preferably, approximately 3:1 to 3.5:1.

After coagulation, the coagulated fibers or fibrets are washed to remove at least the major portion of residual spinning solvent. The washed fibers or fibrets typically contain less than about 1 percent by weight solvent based on the weight of the fibers or fibrets, and preferably are washed so as to obtain an essentially solvent-free fibrous material (i.e., a fibrous material containing less than about 0.1 percent solvent by weight). Typically, a simple water wash is employed; however, if desired, other wash materials such as acetone, reethanol, methylethyl ketone and similar solvent-miscible and volatile organic solvents may be used in place of or in combination with the water. The preferred washing zone for fibers of the present invention comprises a set of skewed rolls, the bottom one of which is partially immersed in the wash liquid. Although a wide range of temperatures may be employed, the wash liquid is preferably provided at a temperature of approximately 15° to 65° C. By wrapping the filaments several times around the skewed rolls, the filaments remain for some time on the rolls, during which they are washed free of solvent. The filaments from the first set of skewed rolls (wash rolls) are passed to a drying zone. Although any appropriate apparatus may be used, the filaments are preferably dried by passing them over a set of steam-heated (e.g., to approximately 100° C.) skewed rolls. Again, the number of wraps given the filaments determines the length of time on the rolls. Sufficient time is provided to assure that the filaments are thoroughly dried before they are subjected to the high temperature drawing step of the process.

In the fiber spinning processes of the invention, the manner in which heat is applied to the fiber undergoing hot drawing may be varied widely. For instance, the fiber may be heated via radiation by passage through a muffle furnace or other hot gals heating zone. Alternatively, the fiber undergoing hot drawing may be heated via conductive heating wherein the fiber is passed over a hot surface, such as one or more hot shoes, rolls, plates, pins, etc. Drawing of the filament is preferably accomplished by passing the dried filaments through a heated muffle furnace at approximately 350° to 500° C. Skewed rolls before and after the muffle furnace are accurately maintained at different speeds to maintain the filaments under a desired degree of tension. The combination of the spin line tension and the muffle furnace temperature causes the filaments to elongate. In so doing, the polymeric structure within the filaments becomes somewhat better organized, and physical properties are improved. Tension on the filaments is maintained so that the hot draw ratio is approximately 1.5:1 to 20:1. A hot draw ratio of approximately 2:1 to 6:1 is preferred, and a hot draw ratio of approximately 3:1 to 3.5:1 is most preferred. The hot draw ratio is a measure of the degree of stretching of the filaments which occurs in the hot drawing zone. While any of the several known ways for measuring or determining draw ratio may be employed, typically the draw ratio is found by taking the ratio of the surface speed of a take-up roll at the exit end of the drawing zone to the surface speed of a feed or supply roll at the entrance end of the drawing zone. Preferably, the hot draw ratio is determined by the relative speeds of the set of exit rolls and the set of drying rolls, which serve as feed rolls to the drawing zone. The drawn filaments are collected by any conventional means. The physical properties of the filaments produced by the process of the invention may be measured by standard ASTM test methods. The filaments have a denier per filament of approximately 1 to about 10. The preferred denier per filament is about 2 to about 5, and a denier per filament of about 2.0 to about 3 is most preferred. The filaments have a tenacity of at least about 3 grams per denier. The physical properties preferably range from about 3 to 15 grams per denier tenacity, about 2 to 40 percent elongation, and about 80 to 400 grams per denier modulus. These properties are better than those obtained with similar denier per filament polybenzimidazole fibers.

All subsequent processing is done in the same manner as with the other methods.

For PBI itself, good yarn was obtained from a 25% DMAC dope spun through a spinneret having 100 micron orifices, into a plain water bath, ½m long, at 10-20m/min.

Dry spinning is the most preferred method, dry jet-wet spinning is next preferred and wet spinning is next preferred.

A process for the production of fibrets of the polymer blend comprises:

(a) forming a spinning solution comprising approximately 10 to 35 percent by weight of the component polymers of the blend in a mutual solvent, (b) extruding the spinning solution through a plurality of extrusion orifices having diameters of approximately 20 to 200 microns and into an agitated coagulating bath comprised of a non-solvent for the component polymers in order to form a plurality of fibrets, (c) passing the fibrets through the coagulating bath wherein (i) coagulation of the blend of the component polymers is accomplished, and (ii) the agitation of the coagulation bath is sufficiently vigorous to form the fibrets, (d) washing the resulting fibrets to substantially remove residual solvent, (e) drying the fibrets, and (g) collecting the fibrets.

Preferably, in the process for the production of the fibrets, the spinning solution is extruded at a temperature of approximately 15° to 150° C. and the extrusion orifices have a diameter of approximately 50 to 200 microns.

The fibers or fibrets may be post-treated with heat or sulfuric acid for a period of time sufficient to minimize their shrinkage when subsequently subjected to heat and in order to increase their resistance to solvents, such as DMAC and NMP, and acids, e.g., concentrated inorganic acids, such as hydrochloric acid. After post-treatment, the fibers or fibrets are no longer completely soluble in the solvents used to initially form the solutions of the constituent polymers, e.g., DMAC or NMP. Post-treating by heating in air or in an inert atmosphere at a temperature of from about 200° to about 500° C. for a period of time of from about 1 to about 30 minutes may be employed. The time-temperature relationship to obtain the required results can be determined empirically. Preferably, heating at a temperature of from about 300° to about 450° C. may be used.

Alternatively, the fibers or fibrets may be post-treated by treating with a sulfonating agent followed by heat setting at a temperature of from about 200° to about 500° C. for a period of time sufficient to minimize shrinkage when the fibers or fibrets are subsequently subjected to heat and to increase the fibers or fibrets' resistance to solvents and acids. A solution of from about 1 to about 15% sulfonating agent followed by heat setting at a temperature of from about 200° to about 500° C. may be used. The sulfonating agent may be sulfuric acid, sulfur trioxide, toluene sulfonic acid or naphthalene sulfonic acid. Preferably, post-treatment is accomplished by dipping the fibers or fibrets in 5% sulfuric acid followed by heat setting at a temperature of from about 350° to about 450° C. for a period of time sufficient to minimize the fibers' or fibrets' shrinkage when subsequently subjected to heat and to increase their resistance to solvents and acid.

The following examples describe the manner and process of making the fibers and fibrets of the invention and set forth the best mode contemplated by the inventors for carrying out the invention, but are not to be construed as limiting.

In the following examples, the preferred aromatic polybenzimidazole polymer is used, namely, poly-2,2'-(m-phenylene)-5,5'-bibenzimidazole (sometimes hereafter referred to as "PBI").

EXAMPLE 1

Six percent of one variant of HOECHST high performance HMA aromatic polyamide[1] was dissolved in NMP with 1% LiCl. The dope prepared in that manner was very viscous, behaved like a non-Newtonian fluid and showed a rod-climbing phenomenon (Weissenberg effect) during agitation. The best approach to prepare HMA/PBI/LiCl/NMP dope is to make two separate dopes, one is HMA/LiCl/NMP and the other is PBI/LiCl/NMP, and then blend them together at 100°-120° C. for 1-2 hours at atmospheric pressure with good agitation.

[1] HMA is the developmental designation of a high performance aromatic polyamide produced by HOECHST AG. The HOECHST HMA aromatic polyamide is made from terephthaloyl chloride and a mixture of 3 diamines:

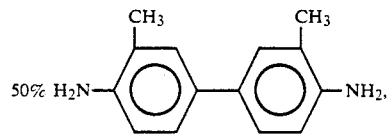

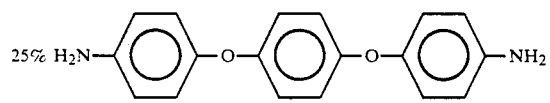

and

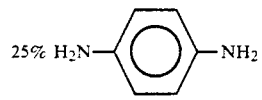

Dopes were prepared from 4 weight percent each of HMA and PBI in a LiCl/NMP solvent system containing 2% LiCl based on solvent. The dopes were cast on cold or hot glass plates and dried at different temperatures. Drying should not take place at temperatures higher than 120° C. for long periods, otherwise the films become dark, a sign of degradation. Films dried at 100° C. in a vacuum seem to be clear and transparent, another sign of miscibility of the component polymers of the blend.

Figure 2A:
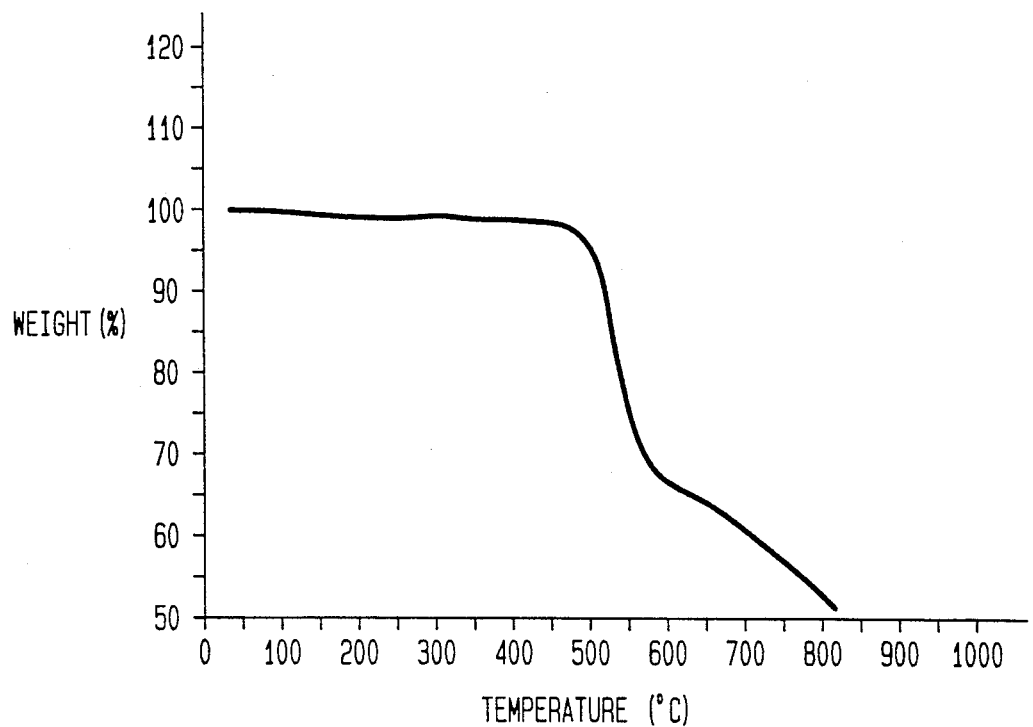
FIG. 2a shows the Thermal Gravimetric Analysis scan of a film of an aromatic copolyamide (HMA).

FIG. 2a shows the Thermal Gravimetric Analysis scan (TGA) of a film of a HOECHST HMA aromatic polyamide. The HMA started to degrade before 500° C. in nitrogen and lost 30% of its weight at 550° C.

Figure 2B:
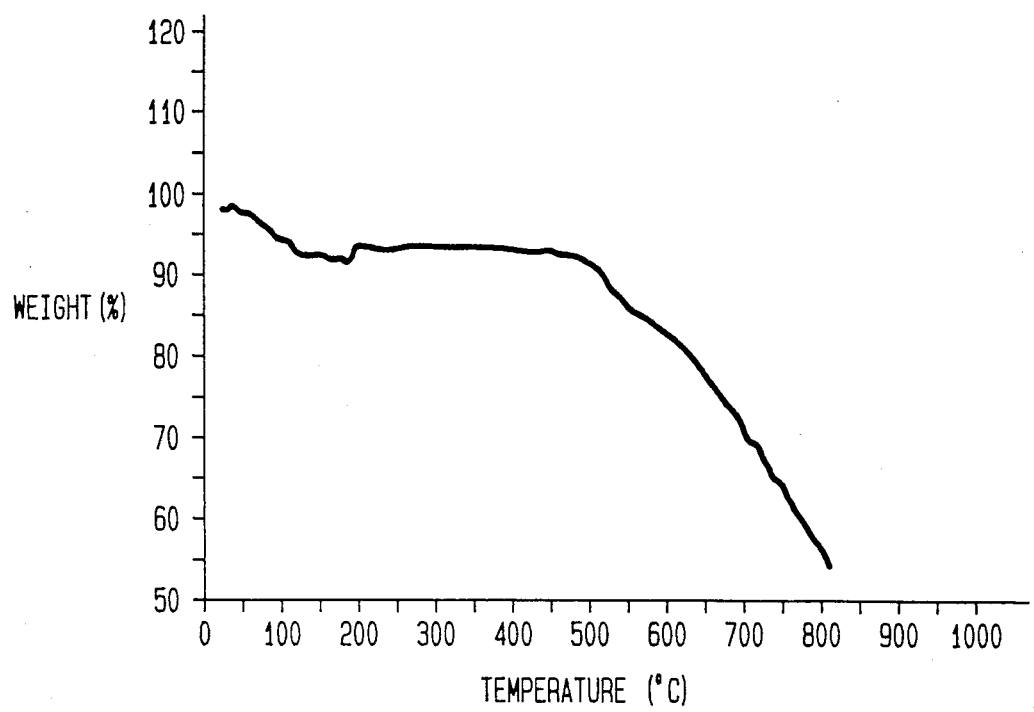
FIG. 2b shows the Thermal Gravimetric Analysis scan of a film of a 50:50 blend of an aromatic copolyamide (HMA) and a polybenzimidazole (PBI).

FIG. 2b shows the Thermal Gravimetric Analysis scan of a film of a 50:50 blend of a HOECHST HMA aromatic polyamide and polybenzimidazole. The film only lost 10% weight (water) at 550° C. These results clearly demonstrate that the polybenzimidazole did protect the HMA from thermal degradation.

Figure 4A:
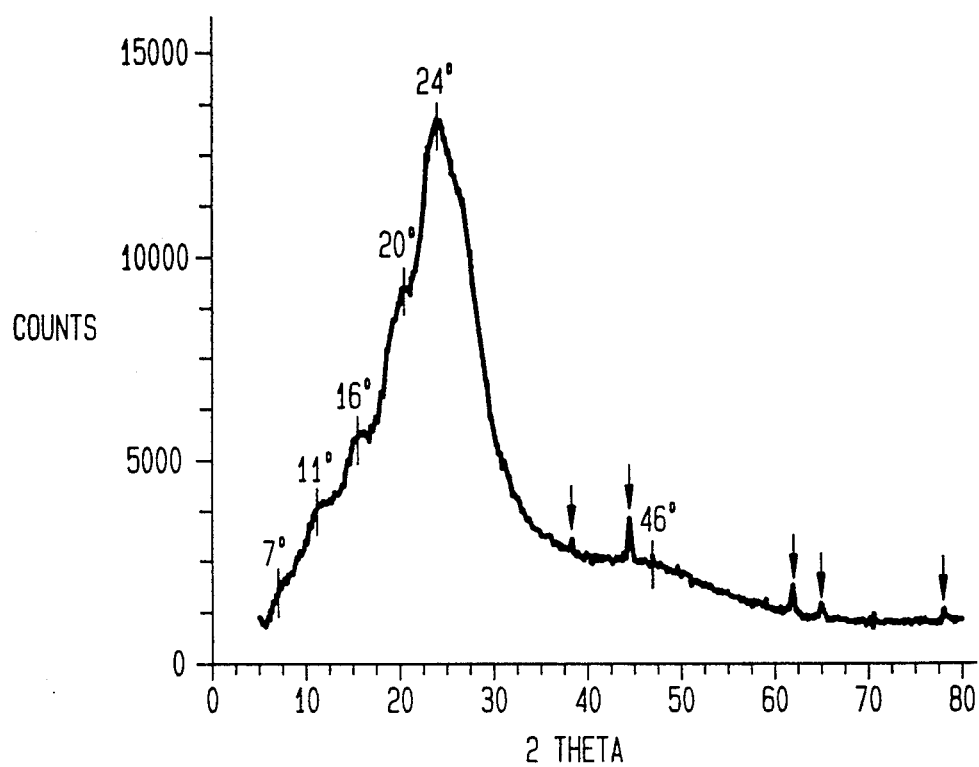
FIG. 4a shows an X-ray diffraction pattern of a film of a polybenzimidazole (PBI).

FIG. 4a shows an X-ray diffraction pattern of a film of polybenzimidazole. A broad peak is observed at ~24° (2θ) with four small amorphous left shoulders found at approximately 7°, 11°, 16° and 20° (2θ). A tiny amorphous region is also observed at ~46° (2θ). The five small sharp peaks indicated by arrows (↓) in FIG. 4a are attributed to the sample holder.

Figure 4B:
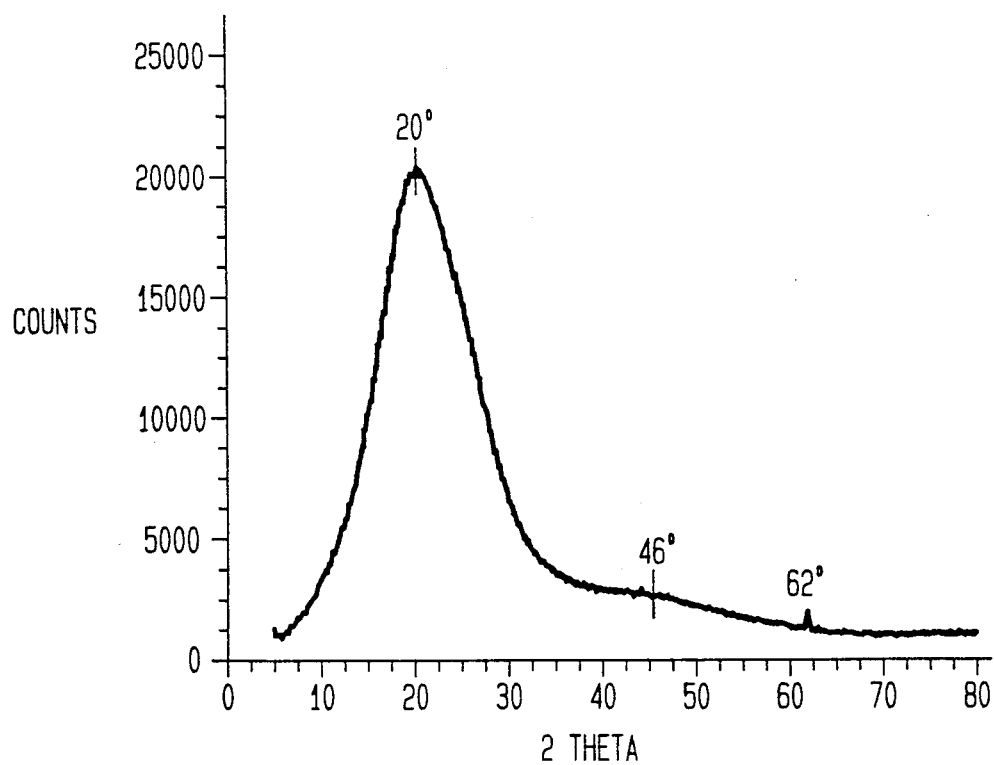
FIG. 4b shows an X-ray diffraction pattern of a film of an aromatic copolyamide (HMA).

FIG. 4b shows an X-ray diffraction pattern of a film of HMA aromatic polyamide. The pattern indicates that the material is amorphous with one broad peak observed at ~20° (2θ) and a very small amorphous region at ~46° (2θ). The small sharp peak at ~62° (2θ) is attributed to the sample holder. Upon comparison of FIGS. 4a and 4b, it may be seen that the major difference is in the region of the major peak.

Figure 4C:
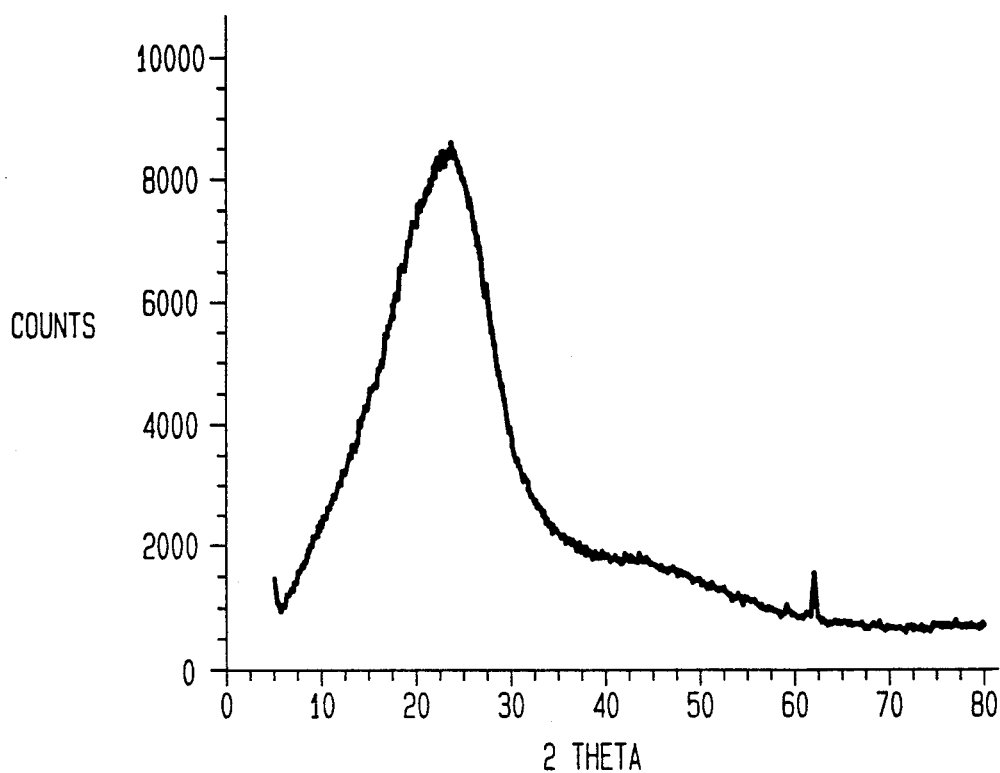
FIG. 4c shows an X-ray diffraction pattern of a film of a 50:50 blend of an aromatic copolyamide (HMA) and a polybenzimidazole (PBI), indicating molecular mixing.

FIG. 4c shows an X-ray diffraction pattern of a film of a 50:50 blend of HMA aromatic polyamide and the polybenzimidazole. There is only one major peak at ~23° (2θ).

Figure 4D:
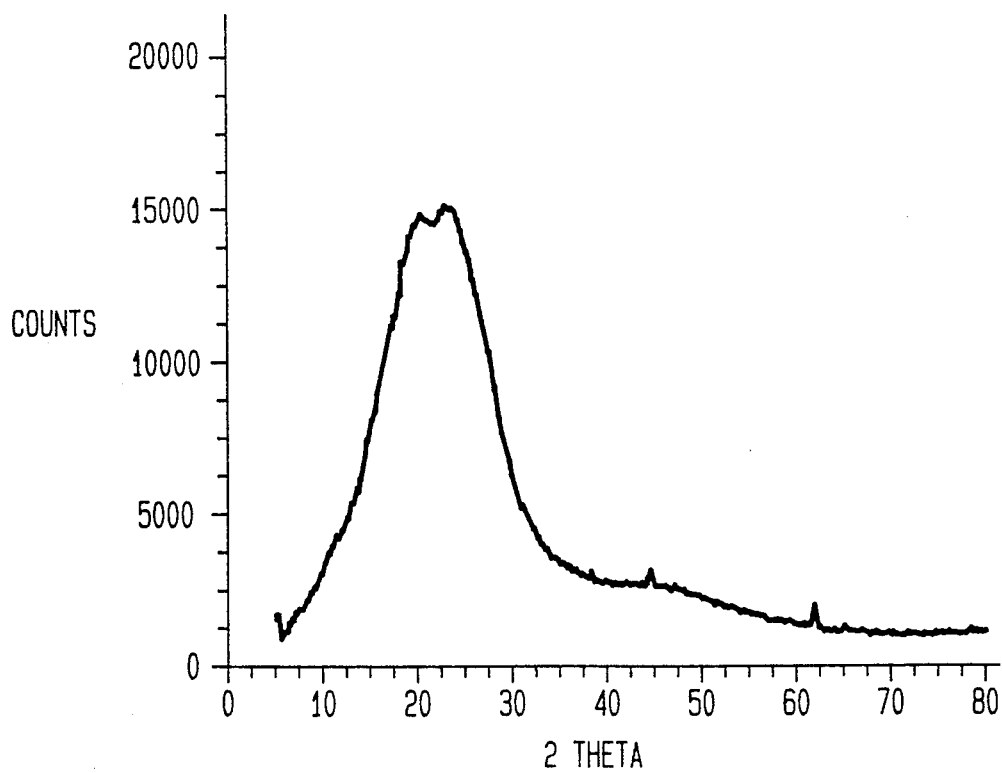
FIG. 4d shows a computer-generated X-ray diffraction Pattern addition of 50:50 blend of an aromatic copolyamide (HMA) and polybeozimidazole (PBI), assuming no molecular mixing occurred.

FIG. 4d shows that (assuming no molecular mixing occurred and based on the patterns for 100% polybenzimidazole and 100% HMA aromatic polyamide films) a computer simulated 50:50 addition of the two constituent polymers in the same blend exhibited two overlapping peaks that are estimated to be ~20° (2θ) and 23° (2θ), which represent the HMA aromatic polyamide and the polybenzimidazole, respectively. However, the actual blend of the two component polymers exhibited only one major peak at ~23° (2θ), as shown in FIG. 4c. These results indicate that the blend is molecularly mixed rather than physically mixed on a larger than molecular scale.

Figure 5A:
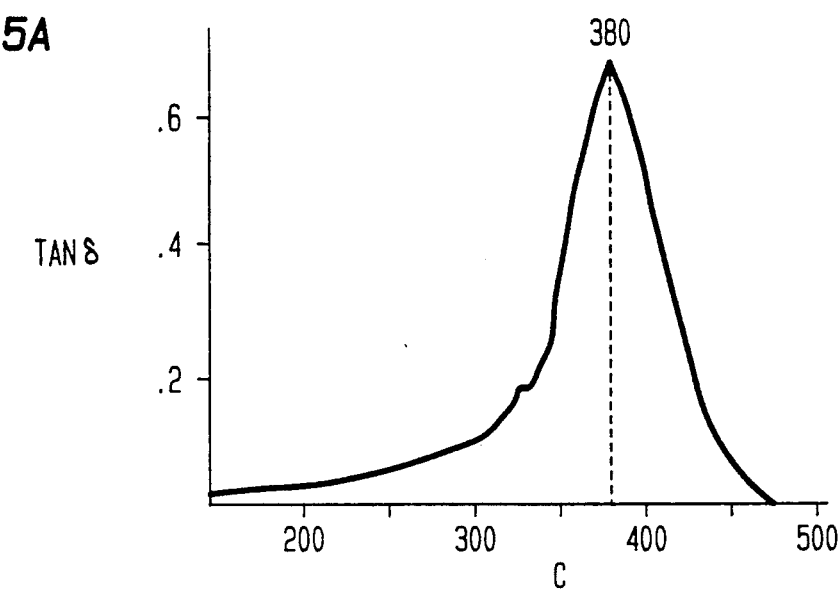
FIG. 5a shows a thermomechanical analysis scan of a blend of 50:50 aromatic copolyamide (HMA) and polybenzimidazole (PBI).

FIG. 5a shows a thermomechanical analysis scan of a 50:50 blend of an aromatic polyamide and a polybenzimidazole.

Figure 5B:
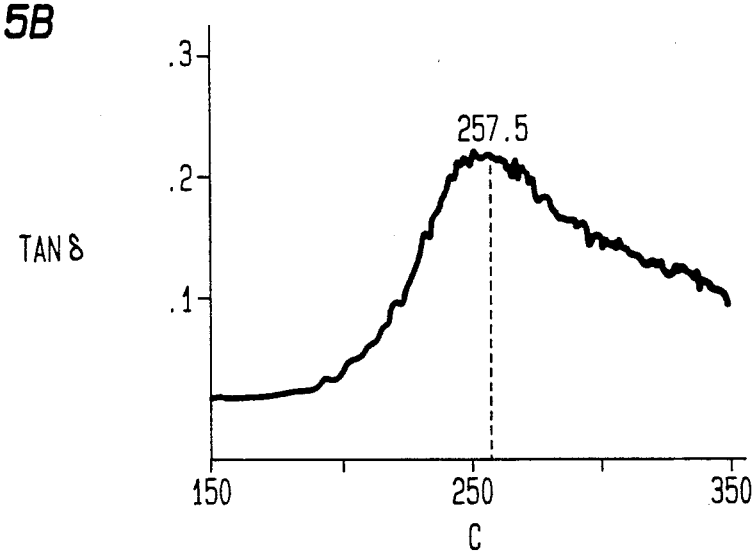
FIG. 5b shows a thermomechanical analysis scan of an aromatic copolyamide (HMA).

FIG. 5b shows a thermomechanical analysis scan of an aromatic polyamide.

Figure 5C:
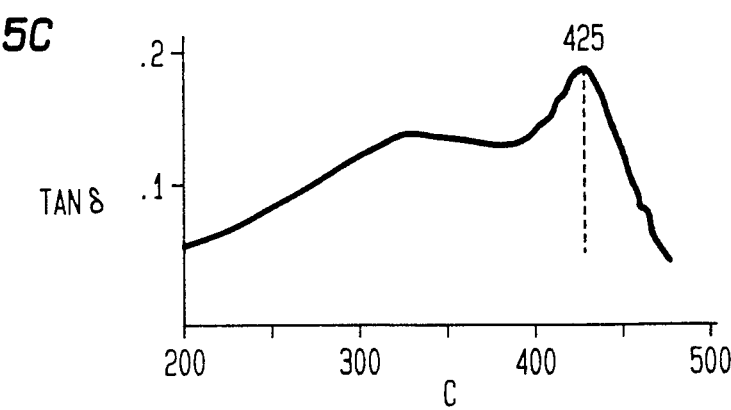
FIG. 5c shows a thermomechanical analysis scan of a polybenzimidazole (PBI).

FIG. 5c shows a thermomechanical analysis scan of a polybenzimidazole.

Dynamic Mechanical Thermal Analysis (DMTA) is an accepted technique for establishing miscibility in blend systems. What one would expect for a miscible blend system is a single Tan δ peak intermediate in position to the peaks of the two component polymers. FIGS. 5a, 5b and 5c suggest that the two component polymers are miscible in the blend. HMA shows a peak in Tan δ at 257.5° C., and PBI shows a glass transition peak at 425° C. The 50:50 blend shows a single Tan δ peak at 380° C.

Figure 6A:
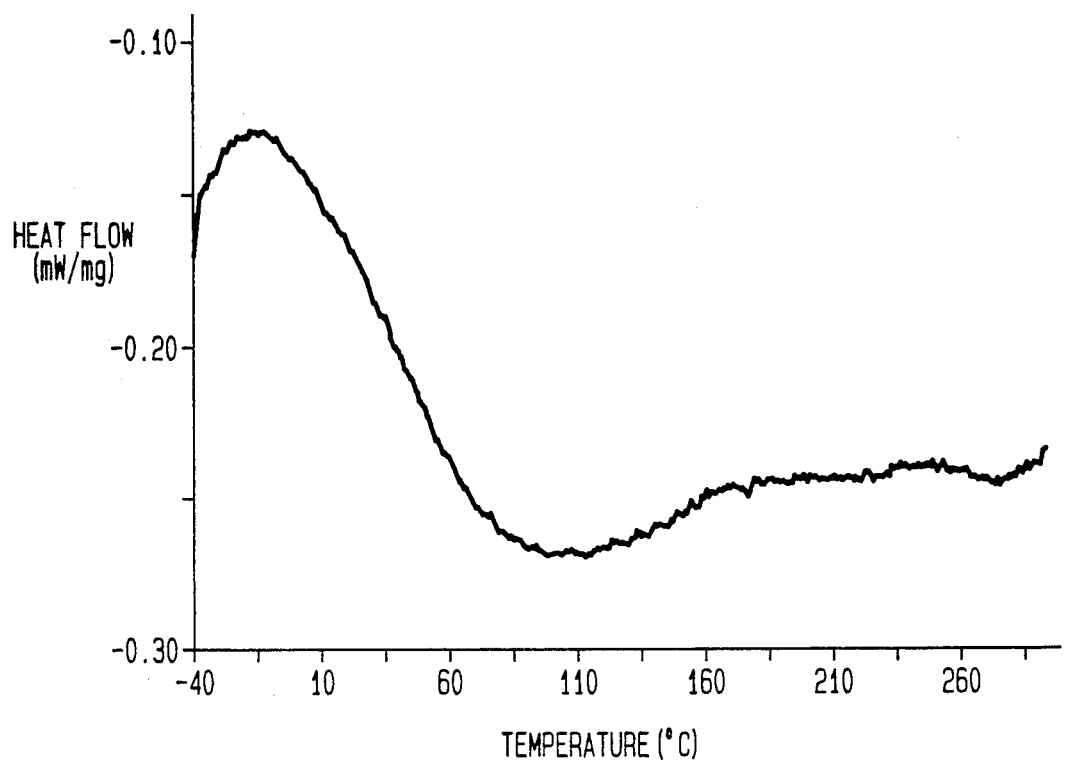
FIG. 6a shows a first heating differential scanning colorimetry curve of an aromatic copolyamide (HMA).

FIG. 6a shows a first heating differential scanning calorimetry (DSC) curve of HMA aromatic polyamide. The first heating ranged from −40° C. to 280° C. and showed two peaks: one is about 100°–110° C., and the other is vague and is about 270°–275° C. The first peak should be the vaporization of water, and the second peak might be the melting point or the initial point of decomposition.

Figure 6B:
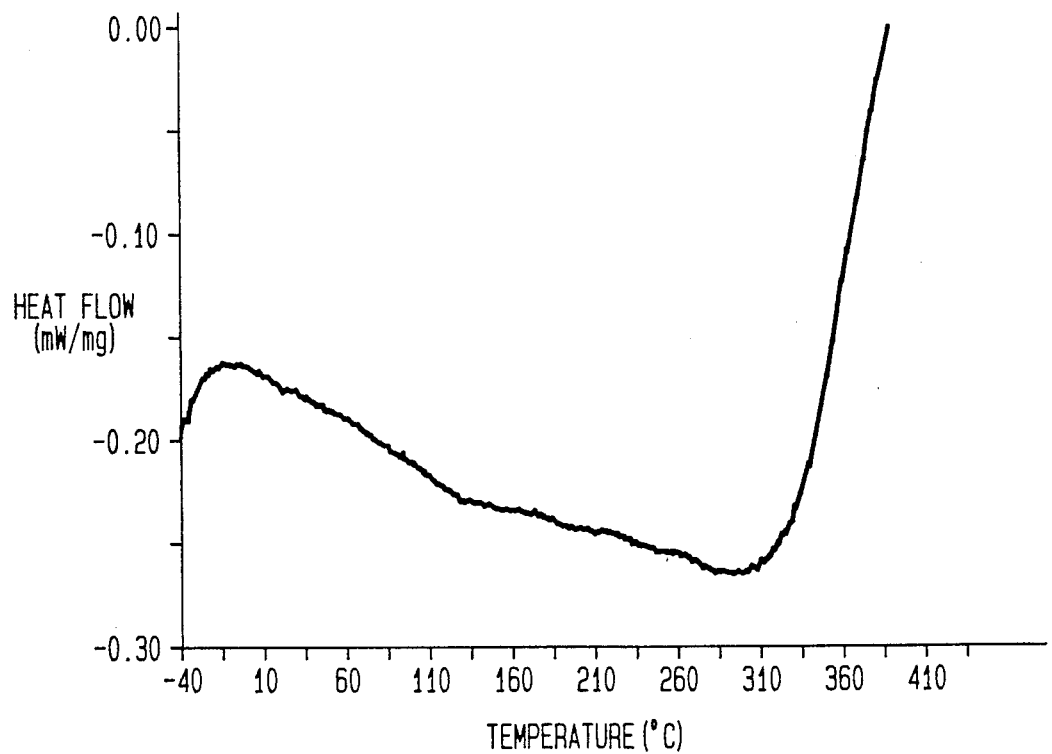
FIG. 6b shows a second heating differential scanning calorimetry curve of an aromatic copolyamide (HMA).

FIG. 6b shows a second heating differential scanning calorimetry curve of the HMA aromatic polyamide. The second heating was conducted on the quenched sample from the first heating and showed that water was almost removed and the vague melting point again appeared around 270°–275° C. The sample decomposed at 310° C., as evidenced by the curve changing from endotherm to exotherm.

Figure 6C:
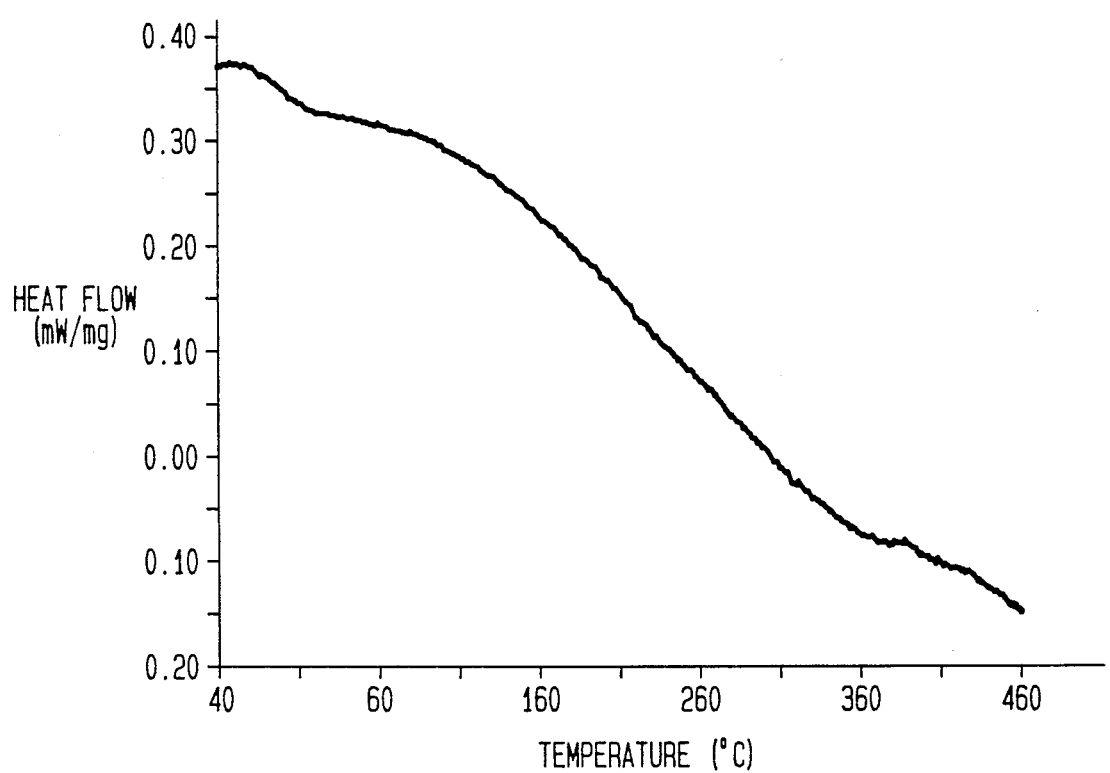
FIG. 6c shows a differential scanning calorimetry curve of a 50:50 end of an aromatic copolyamide (HMA) and a polybenzimidazole (PBI).

FIG. 6c shows a differential scanning calorimetry curve of a 50:50 blend of the HMA aromatic polyamide and the polybenzimidazole. The endotherm that occurred between 60°–115° C. is the vaporization of water. There was no degradation at 310° C. as happens with HMA itself. The transition at 365° C. may be the $T_g$ of the blend. These results clearly demonstrate that the polybenzimidazole did protect the HMA from thermal degradation.

EXAMPLE 2

A 10.5% solids HMA(28.6%)/PBI(71.4%) dope in NMP for wet-spinning was prepared. The HMA was the same as used in Example 1. The dope contained 2% LiCl. The spinneret had five 100-micron holes. The spin bath was methanol(70%)/DMAc(30%); the draw bath was water at 90° C.; and the hot shoe was at 170° C. The take-up speed was around 10 meters/minute. These fibers were further drawn at 400° C. with a draw ratio from 1:1 to 2.59:1. Drawn fibers were much stronger than as-spun fibers.

The following table includes a property comparison between a HMA(28.6%)/PBI(71.4%) blend fiber and a PBI fiber. As can be seen in the Table, blends of the polybenzimidazole (PBI) with the HOECHST HMA high performance polyamide have better tensile strength than that of the PBI itself.

TABLE 1

| | | | | | |
|---|---|---|---|---|---|
| Wet-Spun 28.6/71.4 HMA/PBI Fiber Properties (total solid content of dope = 10.5% in DMAc) | | | | | |
| Sample | Denier (dpf) | Draw ratio | Init. Mod./Tenacity/Elongation | | |
| | | | (g/d) | (g/d) | (%) |
| As-Spun Blend Fiber | 17.79 | | 83.6 | 1.91 | 9.92 |
| Heat Treated | 16.67 | 1.005 | 137.2 | 4.42 | 9.05 |
| Heat Treated | 11.86 | 1.5 | 181.1 | 5.5 | 6.49 |
| Heat Treated | 9.35 | 2.0 | 201.9 | 6.15 | 5.83 |
| Heat Treated | 7.41 | 2.6 | 243.1 | 7.69 | 5.65 |
| PBI Control | 7.43 | 2.0 | 66.0 | 3.61 | 47.74 |
| HMA control | 3.13 | 2.0 | 642.0 | 29.3 | 5.58 |

Both TGA and DSC data show that hot-drawn and as-spun fibers had almost the same thermal properties. Their decomposition temperatures were in the range of 400°–450° C. No degradation occurred at 310° C., as happens with HMA itself, which demonstrates that PBI protected HMA from thermal degradation.

Figure 1B:
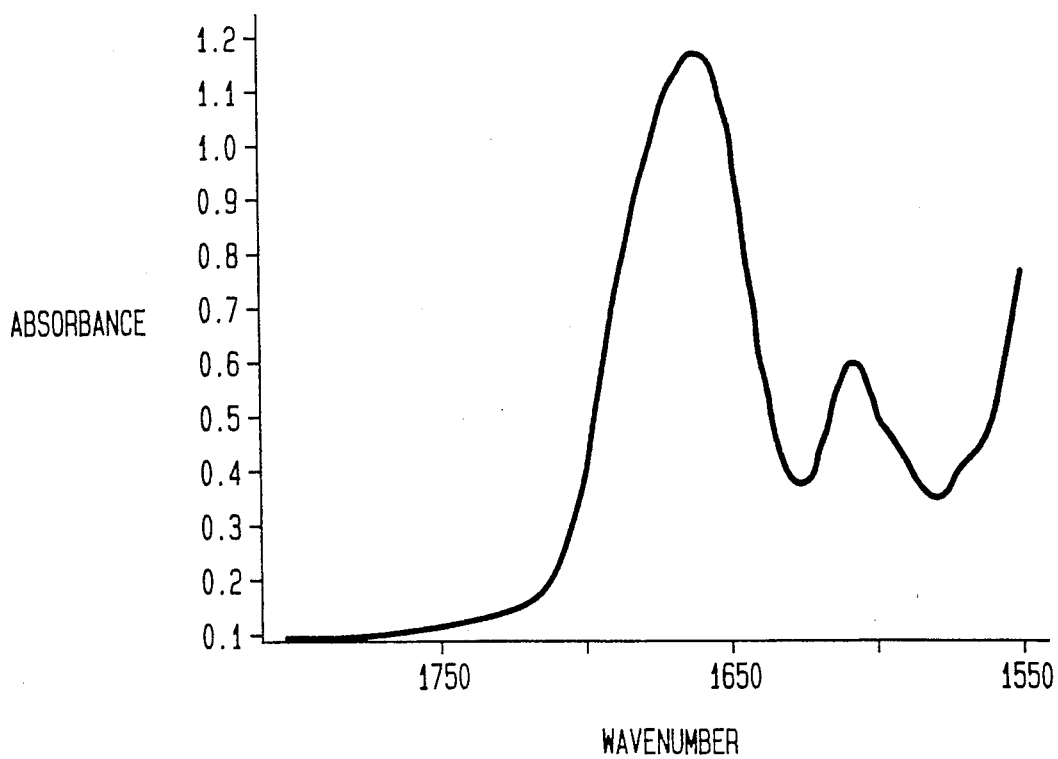
FIG. 1b shows the Fourier Transform IR scan of the aromatic copolyamide (HMA).
Figure 1C:
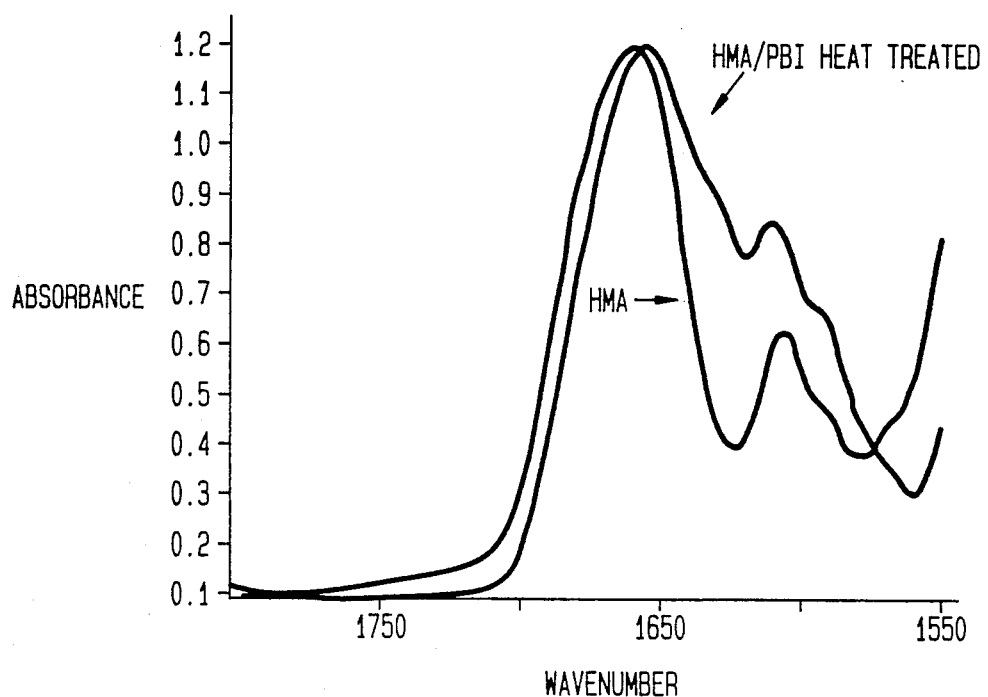

The interaction between the HMA and PBI can be further detected by observing the IR frequency of the carbonyl band. The downfield shifting of the carbonyl band is a well known phenomenon for hydrogen bonding of the carbonyl group. In pure HMA, the carbonyl band appears at 1657 cm$^{-1}$. FIG. 1b shows the Fourier Transform IR scan of HMA film. FIG. 1a shows the Fourier Transform IR observed intermolecular hydrogen bonding in fibers of a 71.4/28.6 polybenzimidazole/HMA aromatic polyamide (HMA) blend. Because of the hydrogen bonding, the absorbance peak of the carbonyl group of the aromatic polyamide shifted from 1657 to 1655 cm$^{-1}$ in the spun fiber and then to 1647 cm$^{-1}$ in the heat-treated and drawn fiber. This frequency shift suggests that the degree of association has increased. FIG. 1c shows the Fourier Transform IR scan of FIG. 1b together with a scan of the heat-treated and drawn fibers of a 71.4/28.6 polybenzimidazole/aromatic copolyamide blend, as shown in FIG. 1a.

EXAMPLE 3

Another variant of HMA aromatic polyamide[2] was found to be more soluble in DMAC and was easier to mix. 50/50 HMA/PBI blend fibers were prepared from both wet and dry spinning processes, and their tensile properties are summarized in Tables 2A and 2B. The wet-spun fiber properties are slightly inferior to those of a dry-spun one, possibly because the former has a greater denier than the latter. Similar results are shown in Tables 3A and 3B for 20/80 HMA/PBI fibers. For wet-spun fibers, the coagulation bath also had a significant effect on the ultimate fiber properties, as illustrated in Table 4. A mixture of ethylene glycol/DMAc solvent provided better coagulation in the process and yielded higher tensile properties in the fibers than those coagulated with water. The effect of drawing on dry-spun fiber properties is given in Table 5, which shows that the best results occurred at a draw ratio of 4.5:1. In addition, we found that as-spun fibers seem to become brittle after remaining in a laboratory for a few weeks, probably due to the evaporation of residual DMAC solvent. Therefore, the hot-drawing process should take place immediately after dry-spinning/washing/drying of the fibers. Otherwise, fiber properties seem to decrease.

[2] HMA is the developmental designation of a high performance aromatic polyamide produced by HOECHST AG. The HOECHST HMA aromatic polyamide is made from terephthaloyl chloride and a mixture of 3 diamines:

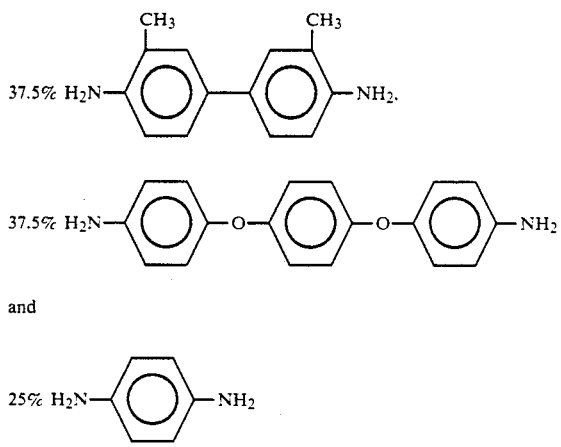

and

The effect of sulfonation and heat-setting on fiber properties is given in Tables 6A and 6B for 50/50 and 40/60 HMA/PBI blend fibers, respectively. Both modulus and tenacity are decreased as a result of sulfonation and heat-set. However, the denier is slightly increased with the formation of aryl sulfonic acid because the density is increased. Table 6B also lists some additional data showing that high tensile modulus can be attained.

FIG. 3a is a 5,000 magnification scanning electron photomicrograph of a fractured surface of a fiber spun from a 50:50 blend of an aromatic copolyamide and a polybenzimidazole. The photomicrograph shows that the degree of the blend is on the molecular level and that the fracture morphology is similar to that of a typical fracture of a rigid rod-like polymer. FIG. 3b is a 5560 magnification scanning electron photomicrograph of a fracture surface of a fiber spun from a polybenzimidazole and shows no orientation phenomenon. FIGS. 3c and 3d are respectively 2,000 and 5,000 magnification scanning electron photomicrographs of a fracture surface of a fiber spun from an aromatic copolyamide, showing fracture morphology similar to that of the blend in FIG. 3a.

TABLE 2A

Wet-Spun 50/50 HMA/PBI Fiber Properties
(total solid content of doper = 11% in DMAc)

| Sample | Denier (dpf) | Draw ratio | Init. Mod. (g/d) | Tenacity (g/d) | Elongation (%) |
|---|---|---|---|---|---|
| As-Spun Fiber | 9.8 | | 73 | 1.78 | 23.46 |
| Hot drawn | 5.75 | 1.5 at 400° C. | 272 | 8.06 | 3.9 |

TABLE 2B

Dry-Spun 50/50 HMA/PBI Fiber Properties
(total solid content of dope = 11% in DMAc)

| Sample | Denier (dpf) | Draw ratio | Init. Mod. (g/d) | Tenacity (g/d) | Elongation (%) |
|---|---|---|---|---|---|
| As-Spun Fiber | 3.6 | | 81.4 | 3.781 | 55.2 |
| Hot drawn | 0.783 | 4.5 at 400° C. | 302. | 10.83 | 7.3 |

TABLE 3A

Wet-Spun 20/80 HMA/PBI Fiber Properties
(total solid content of dope = 17.8% in DMAc)

| Sample | Denier (dpf) | Draw ratio | Init. Mod. (g/d) | Tenacity (g/d) | Elongation (%) |
|---|---|---|---|---|---|
| As-Spun Fiber | 24.5 | | 41.1 | 1.08 | 4.03 |
| Hot drawn | 3.347 | 7 at 440° C. | 181. | 7.33 | 10.43 |

TABLE 3B

Dry-Spun 20/80 HMA/PBI Fiber Properties
(total solid content of dope = 17.8% in DMAc)

| Sample | Denier (dpf) | Draw ratio | Init. Mod. (g/d) | Tenacity (g/d) | Elongation (%) |
|---|---|---|---|---|---|
| As-Spun Fiber | 4.933 | | 49.96 | 1.74 | 80.48 |
| Hot drawn | 1.121 | 4.5 at 400° C. | 184.76 | 5.71 | 6.47 |

TABLE 4

Effect of Coagulation Solvent on Wet-Spun 50/50
HMA/PBI Fiber Properties
(total solid content of dope = 11% in DMAc)

| Sample | Denier (dpf) | Coagulation solvent | Init. Mod. (g/d) | Tenacity (g/d) | Elongation (%) |
|---|---|---|---|---|---|
| As-Spun Fiber | 9.8 | 70/30 ethylene glycol/DMAc | 73 | 1.78 | 23.46 |
| Hot drawn at 400° C. DR[3] = 1.5 | 5.75 | 70/30 ethylene glycol/DMAc | 272 | 8.06 | 3.9 |
| As-Spun Fiber | 10.1 | water | 67 | 1.62 | 4.54 |
| Hot drawn at 400° C. DR = 2 | 4.94 | water | 241 | 5.9 | 2.98 |

[3] DR = Draw Ratio.

TABLE 5

Effect of Draw-Ratio on Dry-Spun 50/50 HMA/PBI
Fiber Properties
(total solid content of dope = 11% in DMAc)

| Sample | Denier (dpf) | Draw ratio | Init. Mod. (g/d) | Tenacity (g/d) | Elongation (%) |
|---|---|---|---|---|---|
| A | 1.974 | 1.5 at 400° C. | 211. | 7.53 | 11. |
| B | 1.780 | 2.0 | 231. | 8.10 | 10.8 |
| C | 1.406 | 2.5 | 252. | 9.66 | 10.4 |
| D | 1.082 | 3.0 | 254. | 10.50 | 9.7 |
| E | 0.952 | 3.5 | 288. | 10.26 | 7.6 |
| F | 0.783 | 4.5 | 302. | 10.83 | 7.3 |

TABLE 5-continued

Effect of Draw-Ratio on Dry-Spun 50/50 HMA/PBI Fiber Properties
(total solid content of dope = 11% in DMAc)

| Sample | Denier (dpf) | Draw ratio | Init. Mod. (g/d) | Tenacity (g/d) | Elongation (%) |
|---|---|---|---|---|---|
| G | 0.642 | 5.5 | 287. | 10.33 | 6.4 |

TABLE 6A

Effect of Sulfonation and Heat-Set on Dry-Spun 50/50 HMA/PBI Fiber Properties
(total solid content of dope = 11% in DMAc)

| Sample | Denier (dpf) | Draw ratio | Init. Mod. (g/d) | Tenacity (g/d) | Elongation (%) |
|---|---|---|---|---|---|
| as-spun/hot drawn | 0.925 | 4.5 at 400° C. | 268. | 9.4 | 6.7 |
| acid-treated | 1.139 | | 196. | 6.5 | 5.1 |
| heat-set | 1.224 | 0.997 at 380° C. | 189 | 6.8 | 4.4 |

TABLE 6B

Effect of Sulfonation and Heat-Set on Dry-Spun 40/60 HMA/PBI Fiber Properties
(total solid content of dope = 13.6% in DMAc)

| Sample | Denier (dpf) | Draw ratio | Init. Mod. (g/d) | Tenacity (g/d) | Elongation (%) |
|---|---|---|---|---|---|
| as-spun/hot drawn | 1.564 | 4.5 at 400° C. | 261. | 9.0 | 8.0 |
| acid-treated | 1.771 | | 189. | 5.74 | 5.9 |
| | 2.006 | | 195. | 6.43 | 7.2 |
| heat-set | 1.652 | 0.997 at 380° C. | 198. | 5.44 | 5.2 |
| heat-set | 1.782 | 0.995 | 188. | 5.9 | 5.0 |
| heat-set | 2.225 | 0.993 | 212. | 6.5 | 5.8 |
| | 1.944 | 0.993 | 211. | 7.9 | 7.7 |
| heat-set | 2.332 | 0.990 | 194. | 6.3 | 6.2 | the following Table 7 shows comparative data for PBI and sulfonated PBI fibers.

TABLE 7

Properties of PBI and Sulfonated PBI Fibers

| Properties | Sulfonated PBI | PBI |
|---|---|---|
| Denier per filament | 1.5 | 1.5 |
| Modulus (g/d) | 45 | 90 |
| Tenacity (g/d) | 2.7 | 3.1 |
| Break Elongation (%) | 30 | 30 |
| Density (g/cc) | 1.43 | 1.39 |

EXAMPLE 4

Aromatic polyamide-hydrazides are prepared by solution polymerization in DMAC containing LiCl[4]. Therefore, it is possible to blend a PBI solution in DMAC containing LiCl with a polyamide-hydrazide dope prepared from terephthaloyl chloride and para-amino benzhydrazide in DMAC with LiCl. The polyamide-hydrazide dopes are similar to the HMA dopes and have high viscosities at low solids due to their linearity. The polyamide-hydrazide dopes are used at 5–10% solids as compared with PBI, which is usually fabricated as a 20–25% solids dope. The resulting blend dope (e.g., 50:50) is then be used to cast films and spin fibers and fibrets, the aromatic polyamide-hydrazide improving both the strength and modulus of the blend as compared to PBI itself.

[4] The procedure is to dissolve the p-aminobenzhydrazide in DMAC and 5% LiCl and cool to −10° C. Then add the terephthaloyl chloride with stirring and let it warm to room temperature. This gives a viscous dope in a half hour. Because the polymerization produces HCl which remains in the DMAC, the HCl is neutralized after viscosity increases and prior to spinning by adding LiCO3 and heating the dope to 80° C. This generates more LiCl. The final solids of the solution is about 5–10%.)

EXAMPLE 5

Aromatic polyamides containing heterocyclic linkages may be prepared by solution polymerization in DMAC containing LiCl[5]. Therefore, it is possible to blend a PBI solution in DMAC containing LiCl with a polyamide dope prepared from

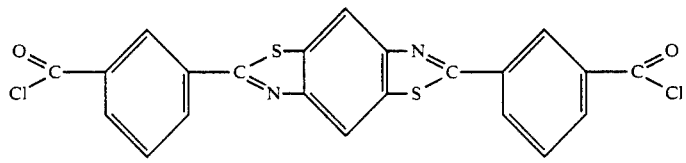

and 4,4'-diaminodiphenyl ether in DMAC with LiCl. The dope is similar to the HMA dopes and has high viscosity at low solids; thus it may be used at 5–10% solids as compared with PBI, which is usually fabricated as a 20–25% solids dope. The resulting blend dope (e.g., 50:50) is then be used to cast films and spin fibers and fibrets, the aromatic polyamide containing heterocyclic linkages improving both the strength and modulus of the blend as compared to PBI itself.

[5] The procedure is to dissolve the 4,4'-diaminodiphenyl ether in DMAC and 5% LiCl and cool the resulting solution to −100° C. Then add the acid chloride with stirring and let the solution warm to room temperature. Because the polymerization produces HCl, which remains in the DMAC, the HCl is neutralized after viscosity increases and prior to spinning by adding LiCO3 and heating the dope to 80° C. This generates more LiCl. The final solids content of the solution is about 5–10%.

What is claimed is:

1. Fibers or fibrets comprised of a blend of component polymers comprising from about 5 weight percent to about 95 weight percent of a polybenzimidazole and from about 95 weight percent to about 5 weight percent of an aromatic polyamide.

2. Fibers or fibrets as claimed in claim 1 in which the polybenzimidazole contains units of the formula:

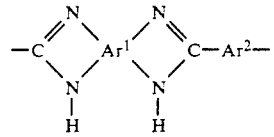

wherein >Ar$^1$< represents a tetravalent aromatic moiety having the formula:

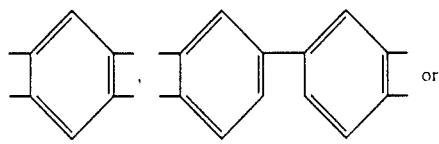

, or

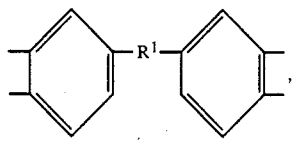

wherein R¹ is —O—, —SO₂—, —CH=CH—, or (—CH₂—)ₓ and x is an integer of from 1 to 4; and —Ar²— represents a divalent aromatic moiety having the formula:

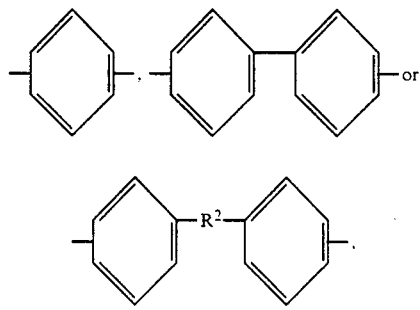

wherein R² is —O—, —SO₂—, —CH=CH—, or (—CH₂—)ₓ and x is an integer of from 1 to 4.

3. Fibers or fibrets as claimed din claim 2 in which the polybenzimidazole is poly-2,2'-(m-phenylene)-5,5'-bibenzimidazole.

4. Fibers or fibrets as claimed in claim 1 in which the aromatic polyamide contains units of the formula:

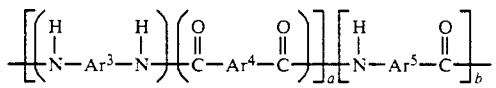

wherein Ar³ and Ar⁴ and Ar⁵ represent divalent aromatic moieties having from 6 to about 18 carbon atoms or mixtures thereof; and wherein b is 0 or a value less than 0.5, and the sum of a and b is equal to 1.

5. Fibers or fibrets as claimed in claim 4 in which the aromatic polyamide is comprised of units

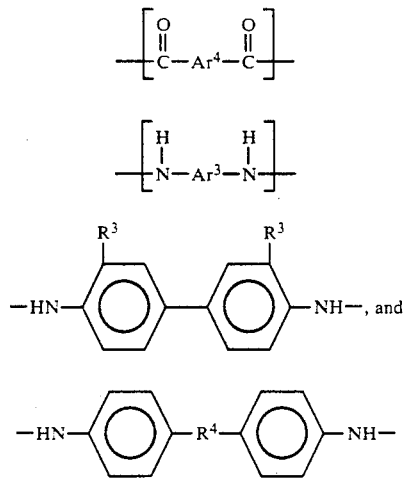

where, unit B is not identical to unit C or unit D; R³ is a halogen radical, or an alkyl or alkoxy radical each having up to 4 carbon atoms; R⁴ is a methylene radical or a grouping —O—Ar³—O, wherein —Ar³— is as specified above, and the mole % proportions of the diamine components B, C and D relative to the total amount of diamine components are within a domain which is defined by the following corner points:

point Q corresponds to 5 mole % of B, 45 mole % of C and 50 mole % of D;

point R corresponds to 45 mole % of B, 5 mole % of C and 50 mole % of D;

point S corresponds to 60 mole % of B, 35 mole % of C and 5 mole % of D;

point T corresponds to 20 mole % of B, 75 mole % of C and 5 mole % of D;

point U corresponds to 5 mole % of B, 80 mole % of C and 15 mole % of D;

and the aromatic polyamide has an inherent viscosity of about 2.4 to 6.5 dl/g (measured on solutions of 0.5 g of polyamide in 100 ml of 98% by weight concentrated H₂SO₄ at 25° C.).

6. Fibers or fibrets as claimed in claim 5 in which the proportions of diamine components B, C and D relative to the total amount to diamine components are within a domain which is defined by the following corner points:

point Q' corresponds to 15 mole % of B, 45 mole % of C and 40 mole % of D;

point R' corresponds to 40 mole % of B, 20 mole % of C and 40 mole % of D;

point S' corresponds to 50 mole % of B, 40 mole % of C and 10 mole % of D;

point T' corresponds to 15 mole T of B, 75 mole % of C and 10 mole % of D.

7. Fibers or fibrets as claimed in claim 5 in which the proportions of diamine components B, C and D relative to the total amount of diamine components are within a domain which is defined by the following corner points:

point W corresponds to 5 mole % of B, 45 mole % of C and 50 mole % of D;

point X corresponds to 45 mole % of B, 5 mole % of C and 50 mole % of D;

point Y corresponds to 45 mole % of B, 40 mole T of C and 15 mole % of D;

point Z corresponds to 5 mole % of B, 80 mole % of C and 15 mole % of D;

and the aromatic polyamide has an inherent viscosity of about 2.4 to 5.0 dl/g (measured on solutions of 0.5 g of polyamide in 100 ml of 98% by weight concentrated H₂SO₄ at 25° C.).

8. Fibers or fibrets as claimed in claim 7 in which the proportions of diamine components B, C and D relative to the total amount of diamine components are within a domain which is defined by the following corner points:

point W' corresponds to 15 mole % of B, 50 mole % of C and 35 mole % of D;

point X' corresponds to 45 mole % of B, 20 mole % of C and 35 mole % of D;

point Y corresponds to 45 mole % of B, 40 mole % of C and 15 mole % of D;

point Z' corresponds to 15 mole % of B, 70 mole T of C and 15 mole % of D.

9. Fibers or fibrets as claimed in claim 5 in which Ar³ and Ar⁴ each denote a 1,4-phenylene radical; Ris —CH₃, —OCH₃ or —Cl; and R⁴ is a

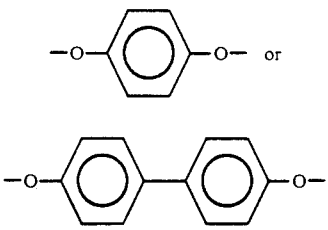

10. Fibers or fibrets as claimed in claim 5 in which the aromatic polyamide has repeating units derived from terephthalic acid and the following diamines:

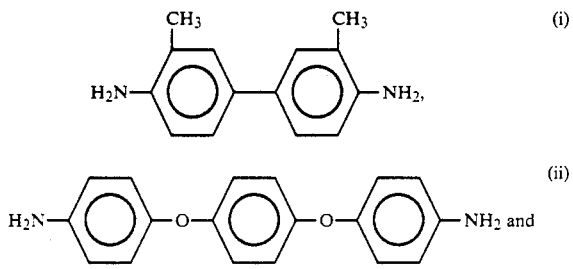

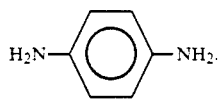

11. Fibers or fibrets as claimed in claim 10 in which the mole ratio of (i):(ii):(iii) is 50:25:25 or 37.5:37.5:25.

12. Fibers or fibrets as claimed in claim 1 wherein said polyamide comprises an aromatic polyamide-hydrazide or an aromatic polyamide containing heterocyclic linkages.

13. Fibers or fibrets as claimed in claim 12 in which the aromatic polyamide-hydrazide has the following unit formula:

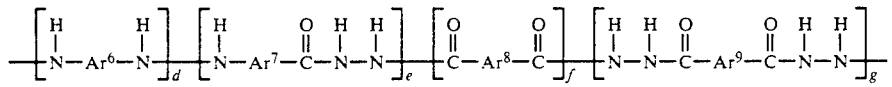

wherein $Ar^5$, $Ar^7$, $Ar^8$ and $Ar^9$ represent divalent aromatic moieties having from 6 to about 18 carbon atoms or mixtures thereof; and wherein d has a value of 0.5 to 1, e is 0 or a value less than 0.5, g is 0 or a value less than 0.5, and the sum of d, e and g is equal to f.

14. Fibers or fibrets as claimed in claim 13 in which the polyamide-hydrazide is prepared from terephthaloyl chloride and para-amino benzhydrazide.

15. Fibers or fibrets as claimed in claim 12 in which the aromatic polyamide containing heterocyclic linkages has the following unit formula:

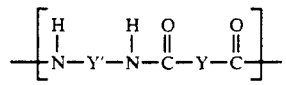

wherein Y' and Y separately represent $Ar^{10}$ and $Ar^1$—O—X—$Ar^{11}$—X—$Ar^{10}$, wherein $Ar^{10}$ and $Ar^{11}$ are multivalent aromatic moieties having from 6 to about 18 carbon atoms, or mixtures thereof; and X is a 5 or 6 member ring heterocyclic radical containing 2 or 3 hetero ring elements selected from the group consisting of N, O and S, and wherein at least one $Ar^{10}$—X—$Ar^1$—X—$Ar^{10}$ radical must be present in the recurring structural unit and the moiety 13 X—$Ar^{11}$—X— may represent a fused ring system.

16. Fibers or fibrets as claimed in claim 15 in which all occurrences of X in the aromatic polyamide containing heterocyclic linkages are the same and the aromatic polyamide containing heterocyclic linkages has at least one plane of symmetry in each recurring unit.

17. Fibers or fibrets as claimed in claim 15 in which the aromatic polyamide containing heterocyclic linkages is prepared from

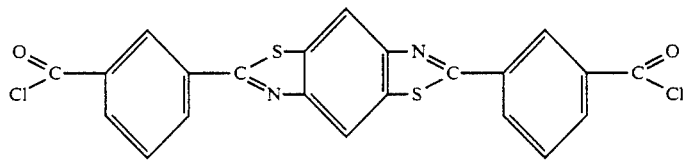

and 4,4'-diaminodiphenyl ether.

18. Fibers or fibrets as claimed in claim 1 in which the aromatic polyamide contains a phthalate moiety,

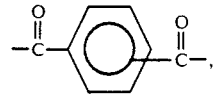

which is comprised of moieties from isophthalic acid, terephthalic acid or a mixture of isophthalic acid and terephthalic acid moieties in a ratio ranging from 99% isophthalic acid to 1% terephthalic acid moieties and 1% isophthalic acid to 99% terephthalic acid moieties.

19. Fibers or fibrets as claimed in claim 1 in which the polybenzimidazole contains units of the formula:

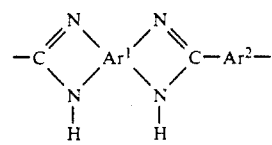

wherein >$Ar^1$< represents a tetravalent aromatic moiety having the formula:

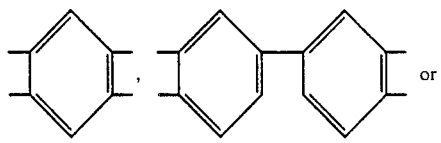

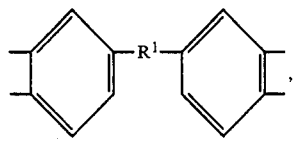

wherein R¹ is —O—, —SO₂—, —CH=CH—, or (—CH₂—)$_x$ and x is an integer of from 1 to 4; and —Ar²— represents a divalent aromatic moiety having the formula:

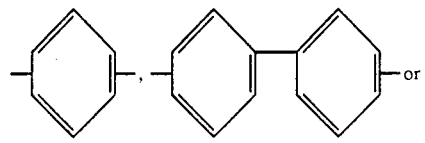

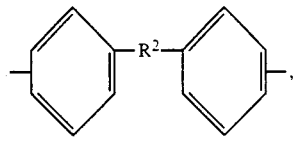

wherein R² is —O—, —SO₂—, —CH=CH—, or (—CH₂—)$_x$ and x is an integer of from 1 to 4; and the aromatic polyamide contains units of the formula:

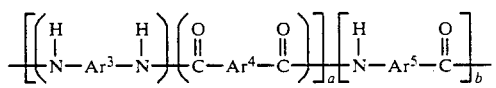

wherein Ar³ and Ar⁴ and Ar⁵ represent divalent aromatic moieties having from 6 to about 18 carbon atoms or mixtures thereof; and wherein b is 0 or a value less than 0.5, and the sum of a and b is equal to 1.

20. Fibers or fibrets as claimed in claim 19 in which the polybenzimidazole is poly-2,2'-(m-phenylene)-5,5'-bibenzimidazole and the aromatic polyamide has repeating units derived from terephthalic acid and the following diamines:

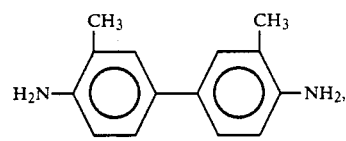
(i)

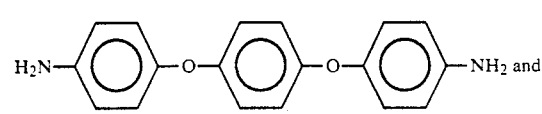
(ii)

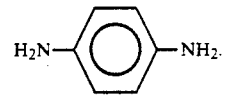
(iii)

in a mole ratio of 50:25:25 or 37.5:37.5:25.

21. Fibers or fibrets as claimed in claim 12 in which the polybenzimidazole contains units of the formula:

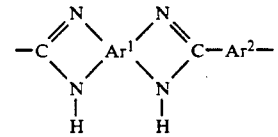

wherein >Ar¹< represents a tetravalent aromatic moiety having the formula:

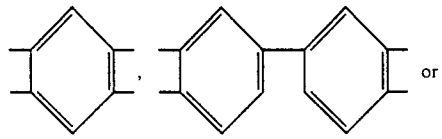

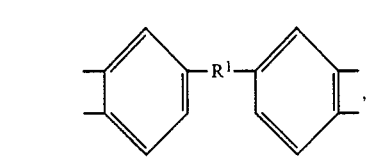

wherein R¹ is —O—, —SO₂—, —=CH—, or (—CH₂—)$_x$ and x is an integer of from 1 to 4; and —Ar²— represents a divalent aromatic moiety having the formula:

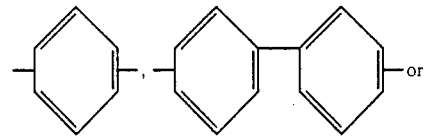

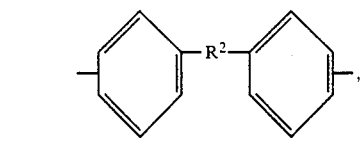

wherein R² is —O—, —SO₂—, —CH=CH—, or (—CH₂—)$_x$ and is an integer of from 1 to 4; and the aromatic polyamide-hydrazide has the following unit formula:

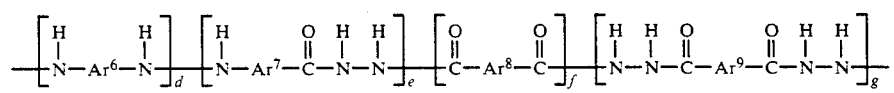

wherein Ar⁶, Ar⁷, Ar⁸ and Ar⁹ represent divalent aromatic moieties having from 6 to about 18 carbon atoms or mixtures thereof; and wherein d has a value of 0.5 to 1, e is 0 or a value less than 0.5, g is 0 or a value less than 0.5, and the sum of d, e and g is equal to f.

22. Fibers or fibrets as claimed in claim 12 in which the polybenzimidazole contains units of the formula:

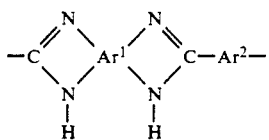

wherein >Ar¹< represents a tetravalent aromatic moiety having the formula:

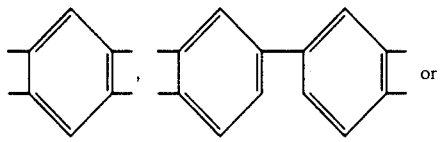

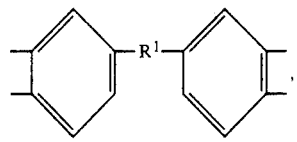

wherein $R^1$ is —O—, —$SO_2$—, —CH=CH—, or (—$CH_2$—)$_x$ and x is an integer of from 1 to 4; and —Ar²— represents a divalent aromatic moiety having the formula:

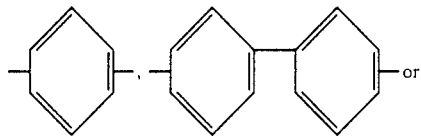

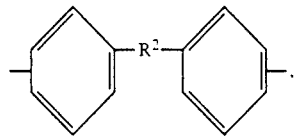

wherein $R^2$ is —O—, —$SO_2$—, —CH=CH—, or (—$CH_2$—)$_x$ and x is an integer of from 1 to 4; and the aromatic polyamide containing heterocyclic linkages has the following unit formula:

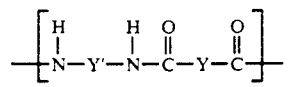

wherein Y' and Y separately represent $Ar^{10}$ and $Ar^{11}$—X—$Ar^{11}$—X—$Ar^{10}$, wherein $Ar^{10}$ and $Ar^{11}$ are multivalent aromatic moieties having from 6 to about 18 carbon atoms, or mixtures thereof; and X is a 5 or 6 member ring heterocyclic radical containing 2 or 3 hetero ring elements selected from the group consisting of N, O and S, and wherein at least one $Ar^{10}$—X—$Ar^{11}$—S—$Ar^{10}$ radical must be present in the recurring structural unit and the moiety —C—$Ar^{11}$—X— may represent a fused ring system.

23. Fibers or fibrets as claimed in claim 22 in which all occurrences of X in the aromatic polyamide containing heterocyclic linkages are the same and the aromatic polyamide containing heterocyclic linkages has at least one plane of symmetry in each recurring unit.

24. Fibers or fibrets as claimed in claim 1 which are comprised of a major amount of a polybenzimidazole and the aromatic polyamide is present in the fibers or fibrets in a minor amount sufficient to yield fibers or fibrets with greater tensile strength, more tractability and processability and also less susceptibility to moisture than polybenzimidazole.

25. Fibers or fibrets as claimed in claim 1 which are comprised of from about 50 weight percent to about 95 weight percent of a polybenzimidazole and from about 50 weight percent to about 5 weight percent of an aromatic polyamide.

26. Fibers or fibrets as claimed in claim 1 which are comprised of at least about 10 weight percent of an aromatic polyamide.

27. Fibers or fibrets as claimed in claim 1 in which the fibers or fibrets are comprised of a major amount of an aromatic polyamide and the polybenzimidazole is present in the fibers or fibrets in a minor amount sufficient to yield fibers or fibrets with increased thermal stability compared to that of the aromatic polyamide, aromatic polyamide-hydrazide or aromatic polyamide containing heterocyclic linkages.

28. Fibers or fibrets as claimed in claim 1 which are comprised of from about 50 weight percent to about 95 weight percent of an aromatic polyamide and from about 50 weight percent to about 5 weight percent of a polybenzimidazole.

29. Fibers or fibrets as claimed in claim 1 which are comprised of at least about 20 weight percent of a polybenzimidazole.

* * * * *